(12) United States Patent
Polk, Jr.

(10) Patent No.: US 7,837,917 B2
(45) Date of Patent: Nov. 23, 2010

(54) METHOD OF FORMING A MOLDED PLASTIC ARTICLE HAVING MOLDED EXTENSIONS

(75) Inventor: Dale E. Polk, Jr., Titusville, FL (US)

(73) Assignee: LRM Industries International, Inc., Rockledge, FL (US)

( * ) Notice: Subject to any disclaimer, the term of this patent is extended or adjusted under 35 U.S.C. 154(b) by 1017 days.

(21) Appl. No.: 11/512,504

(22) Filed: Aug. 30, 2006

(65) Prior Publication Data

US 2008/0057285 A1 Mar. 6, 2008

(51) Int. Cl.
*B29C 45/33* (2006.01)
(52) U.S. Cl. ............ 264/255; 264/259; 264/328.7; 264/328.8; 264/328.11; 264/328.12
(58) Field of Classification Search ............ None
See application file for complete search history.

(56) References Cited

U.S. PATENT DOCUMENTS

| | | | |
|---|---|---|---|
| 4,339,408 A | 7/1982 | Jenkins | |
| 4,353,857 A | 10/1982 | Ray et al. | |
| 5,089,206 A | 2/1992 | Kia | |
| 5,653,932 A | 8/1997 | Aida et al. | |
| 5,679,301 A | 10/1997 | Miklas et al. | |
| 6,165,407 A | 12/2000 | Tahara et al. | |
| 6,267,576 B1 | 7/2001 | Matsubara et al. | |
| 6,471,902 B1 | 10/2002 | Snyder | |
| 6,551,540 B1 | 4/2003 | Porter | |
| 6,589,458 B2 | 7/2003 | DeCost | |
| 6,838,031 B2 | 1/2005 | Kozlovski | |
| 6,869,558 B2 | 3/2005 | Polk, Jr. et al. | |
| 6,884,380 B2 | 4/2005 | Yamaki | |
| 2002/0172803 A1 | 11/2002 | Delusky et al. | |

*Primary Examiner*—Monica A Huson
(74) *Attorney, Agent, or Firm*—Michael A. Ervin; M.A. Ervin & Associates

(57) ABSTRACT

In accordance with the present invention, there is provided a method of forming a molded plastic article (2) having a second surface (56) with molded extensions (59), e.g., structural supports, such as ribs, extending therefrom, and a first surface (69) that is substantially free of sink mark defects. The method involves forming, from a first plastic material, a first molded section (50) having at least one molded extension (59) extending from the second surface (56) thereof. The molded extension (59) is formed in a mold recess (23) having a reversibly positionable slide (14) therein. After formation of the first molded section (50), the slide (14) is retracted to a second slide position (B) thus forming within the molded extension a retainer cavity (74) that is in fluid communication with an aperture (71) in the first surface (53) of the first molded section (50). A second plastic material is introduced into the mold (1) over the first molded section (50), and a portion thereof passes through the aperture (71) and into the retainer cavity (74), thereby forming a second molded section (108) that is continuous with each retainer (96). The first and second molded sections, which together form the molded article (2), are fixedly attached to each other by at least one molded retainer (96), and the first surface (111) of the second molded section, which defines the first surface (69) of the molded article (2), is substantially free of sink mark defects. The present invention also relates to a molded article.

14 Claims, 14 Drawing Sheets

METHOD OF FORMING A MOLDED PLASTIC ARTICLE HAVING MOLDED EXTENSIONS

FIELD OF THE INVENTION

The present invention relates to a method of forming a molded plastic article having a second surface with molded extensions (e.g., structural supports, such as ribs) extending therefrom, and a first surface that is substantially free of sink mark defects. The molded article is formed using a mold that includes a first mold portion having a recess having a positionable slide located therein. During formation of a first molded section of the article, the slide is positioned in a first slide position such that the exterior surfaces of the slide and the internal surfaces of the recess together define an extension cavity in which the molded extension is formed. The slide is retracted to a second slide position so as to form an aperture in the first molded section and define a retainer cavity within the molded extension. A second plastic material is introduced into the mold and a portion thereof passes through the aperture into the retainer cavity, thereby forming a second molded section that is continuous with a molded retainer. The first and second molded sections, which form the molded article, are fixedly attached to each other by at least one molded retainer. The present invention also relates to a molded article as described above.

BACKGROUND OF THE INVENTION

Many molded plastic articles are formed so as to include a cosmetic outer (or forward) surface and a noncosmetic inner (or rear/rearward) surface. Such a configuration allows a molded plastic article to be mounted to another structure (e.g., an underlying support structure, such as a frame) by means of the non-cosmetic rear surface without adversely affecting (e.g., damaging) the cosmetic forward surface. If in the form of a molded plastic housing (e.g., a computer or mobile phone housing), separate items, such as electronic components, may be secured to the inner non-cosmetic surface, without adversely affecting the outer cosmetic surface of the housing.

To assist mounting a molded plastic article to an underlying structure, or to secure items to the inside of a molded plastic housing, the rear or inner surface of the molded plastic article typically has molded extensions, e.g., molded mounting extensions such as posts and bosses, extending therefrom. For example, the molded article may be mounted on an underlying frame by means of fasteners, such as screws, passing through the frame and into the molded mounting extensions.

In many applications and industries in which molded plastic articles are used, it is desirable to reduce weight without compromising the structural integrity of the molded plastic article. Such weight sensitive applications and industries include, for example, transportation industries, such as the ground, marine, rail and air transportation industries, electronic industries, such as the computer, mobile phone and personal digital assistant industries, and construction industries (e.g., interior and exterior wall panels, and structure fascias). The weight of a molded plastic article may be reduced by reducing the amount of plastic material used to fabricate the molded article. Typically, the weight of a molded plastic article is reduced by making it thinner. To maintain the same level of dimensional stability and structural integrity relative to a thicker molded article, thinner molded articles are typically designed to include structural supports (e.g., ribs) extending from the non-cosmetic rear surface thereof.

Extensions, such as structural and/or mounting supports, extending from the rear surface of a molded plastic article are often undesirably accompanied by defects, such as sink marks in the outer or cosmetic forward surface of the molded article, or warping defects throughout at least a portion of the molded article. Sink mark defects are typically located on the forward surface opposite of the rearward extension. The defects are generally undesirable because of an accompanying reduction in cosmetic appearance (e.g., in the case of sink marks), and structural integrity (e.g., in the case of warping defects).

It would be desirable to develop new plastic molding methods that result in the formation of molded plastic articles having molded extensions, such as structural supports, extending from one surface, that are free of defects, such as sink marks, in the opposite surface thereof. It would be further desirable to develop molded plastic articles having molded extensions extending from one surface, and which are free of defects (e.g., sink marks) in the opposite surface thereof.

U.S. Pat. No. 6,551,540 B1 discloses a method of forming a molded vehicle component having structural ribs, that is free of visible sink marks. The method of U.S. Pat. No. '540 is disclosed as involving first forming a primary vehicle component having structural ribs by injecting thermoplastic material into a first mold cavity. The mold is moved to form a second mold cavity, and additional thermoplastic material is injected therein so as to overmold the front face of the primary vehicle component, thus covering any sink marks in the front face.

U.S. Pat. No. 4,339,408 discloses a method of molding a hollow, plastic article having ribs extending from its walls. The method of U.S. Pat. No. '408 involves first injecting plastic material into a mold to form a wall portion, and allowing the wall portion to cool in the mold. Next, additional plastic is injected into the rib forming cavity of the mold, the plastic material of the ribs is allowed to completely set, and the molded article having ribs is ejected from the mold.

U.S. Pat. No. 5,089,206 discloses a dual charge thermosetting compression molding method by which a molded article having ribs, and no sink mark defects, is formed. The method of U.S. Pat. No. '206 is disclosed as involving placing a first charge of thermosetting plastic material that constitutes ribs into a mold, compressing the first charge, and opening the mold prior to complete cure of the first charge. A second charge of thermosetting plastic material is then placed in the mold, compressed, and the molded article is ejected from the mold. U.S. Pat. No. '206 teaches that after the first compression, it is critical that residual unreacted monomers and oligomers remain in the first charge so as to chemically react with the second charge of plastic material, thereby forming a strong bond there-between.

United States Patent Application Publication No. US 2002/0172803 A1 discloses a method of forming a molded article having at least one compression molded plastic layer and at least one plastic projection extending from and bonded to the inner surface of the compression molded plastic layer. The method of US Application '803 involves first forming a plastic layer by compression molding, allowing the compression molded plastic layer to cool, and then forming plastic projections on the back surface of the compression molded plastic layer by injection molding methods.

SUMMARY OF THE INVENTION

In accordance with the present invention there is provided, a method of forming a molded article having molded extensions (e.g., by injection or reaction injection molding) comprising:
(a) providing a mold comprising,
  (i) a first mold portion having an interior surface comprising at least one recess having an internal surface,
  (ii) at least one slide comprising an exterior surface and a distal extension having a forward surface, at least one recess having said slide therein, said slide being reversibly positionable between a first slide position and a second slide position within said recess, and
  (iii) a second mold portion having an interior surface, said first mold portion and said second mold portion being reversibly positionable relative to each other;
(b) positioning said slide in said first slide position such that said forward surface of said distal extension of said slide extends beyond said interior surface of said first mold portion, the internal surface of said recess at least a portion of the exterior surface of said slide together defining an extension cavity;
(c) positioning said first mold portion and said second mold portion in a first mold position such that the interior surface of said first mold portion and said interior surface of said second mold portion together define a first mold cavity that is in fluid communication with said extension cavity, said forward surface of said distal extension of said slide abutting a portion of said interior surface of said second mold portion;
(d) introducing a first plastic material into said first mold cavity, such that said first plastic material is also introduced into said extension cavity;
(e) allowing said first plastic material introduced into said first mold cavity and said extension cavity to at least partially solidify, thereby forming a first molded section of said molded article comprising a first surface, a second surface and a molded extension formed in said extension cavity, said second surface having at least one molded extension extending therefrom, said molded extension having an internal surface abutting at least a portion of the exterior surface of said slide;
(f) retracting said slide to said second slide position, said forward surface of said distal extension of said slide residing below said first surface of said first molded section, retraction of said slide forming an aperture in said first surface of said first molded section,
wherein the forward surface of said distal extension, a portion of the exterior surface of said slide, and a portion of the internal surface of said molded extension together define a retainer cavity, said retainer cavity being in fluid communication with said aperture and having a lateral dimension that is greater than a lateral dimension of said aperture;
(g) positioning said first mold portion and said second mold portion in a second mold position such that the interior surface of said second mold portion and said first surface of said first molded section together define a second mold cavity, said second mold cavity being in fluid communication with said aperture and said retainer cavity;
(h) introducing a second plastic material into said second mold cavity, a portion of said second plastic material passing through said aperture and into said retainer cavity, thereby forming a second molded section of said molded article comprising a first surface, a second surface and a retainer formed in said retainer cavity, said retainer being continuous with said second molded section through said aperture and abutting at least a portion of said internal surface of said molded extension; and
(i) removing said molded article from said mold, wherein at least a portion of said second surface of said second molded section abuts at least a portion of said first surface of said first molded section, said second molded section and said first molded section being fixedly attached to each other by said retainer, and said first surface of said second molded section being substantially free of sink mark defects, opposite of each molded extension.

In accordance with a further embodiment of the present invention, there is provided a method of forming a molded article having molded extensions (e.g., by compression molding) comprising:
(a) providing a mold comprising,
  (i) a first mold portion having an interior surface comprising at least one recess having an internal surface,
  (ii) at least one slide comprising an exterior surface and a distal extension having a forward surface, at least one recess having said slide therein, said slide being reversibly positionable between a first slide position and a second slide position within said recess, and
  (iii) a second mold portion having an interior surface, said first mold portion and said second mold portion being reversibly positionable relative to each other;
(b) positioning said slide in said first slide position such that said forward surface of said distal extension of said slide extends beyond said interior surface of said first mold portion, the internal surface of said recess and at least a portion of the exterior surface of said slide together defining an extension cavity;
(c) introducing a first plastic material into said first mold portion and said extension cavity, and such that said forward surface of said distal extension of said slide is free of immersion in said first plastic material;
(d) positioning said first mold portion and said second mold portion in a first compressive mold position such that at least a portion of said interior surface of said second mold portion compressively contacts the first plastic material introduced into said first mold portion;
(e) allowing said first plastic material introduced into said first mold portion and said extension cavity to at least partially solidify, thereby forming a first molded section of said molded article comprising a first surface, a second surface and a molded extension formed in said extension cavity, said second surface having at least one molded extension extending therefrom, said molded extension having an internal surface abutting at least a portion of the exterior surface of said slide;
(f) retracting said slide to said second slide position, said forward surface of said distal extension of said slide residing below said first surface of said first molded section, retraction of said slide forming an aperture in said first surface of said first molded section,
wherein the forward surface of said distal extension, a portion of the exterior surface of said slide, and a portion of the internal surface of said molded extension together define a retainer cavity, said retainer cavity being in fluid communication with said aperture and having a lateral dimension that is greater than a lateral dimension of said aperture;
(g) separating said first mold portion and said second mold portion from each other;
(h) introducing a second plastic material into said first mold portion onto said first surface of said first molded section, a portion of said second plastic material passing through said aperture and into said retainer cavity;

(i) positioning said first mold portion and said second mold portion in a second compressive mold position such that at least a portion of said interior surface of said second mold portion compressively contacts the second plastic material introduced into said first mold portion, thereby forming a second molded section of said molded article comprising a first surface, a second surface and a retainer formed in said retainer cavity, said retainer being continuous with said second molded section through said aperture and abutting at least a portion of said internal surface of said molded extension; and (j) removing said molded article from said mold, wherein at least a portion of said second surface of said second molded section abuts at least a portion of said first surface of said first molded section, said second molded section and said first molded section being fixedly attached to each other by said retainer, and said first surface of said second molded section being substantially free of sink mark defects, opposite of each molded extension.

In accordance with the present invention, there is still further provided a molded article having molded extensions comprising:

(a) a first molded section comprising a first surface, a second surface and at least one molded extension extending from said second surface, said molded extension being continuous with said first molded section and having an internal surface defining a retainer space, said first surface of said first molded section having an aperture that is in fluid communication with said retainer space, said first molded section being molded from a first plastic material; and (b) a second molded section having a first surface, a second surface and a retainer, said retainer residing within at least a portion of said retainer space and abutting at least a portion of said internal surface of said molded extension, said retainer being continuous with said second molded section through said aperture, said retainer having a lateral dimension that is greater than a lateral dimension of said aperture, at least a portion of said second surface of said second molded section abutting at least a portion of said first surface of said first molded section, said second molded section being molded from a second plastic material, and said aperture being substantially filled with a portion of said second plastic material, wherein said second molded section and said first molded section are fixedly attached to each other by said retainer, and said first surface of said second molded section is substantially free of sink mark defects, opposite of each molded extension.

The features that characterize the present invention are pointed out with particularity in the claims, which are annexed to and form a part of this disclosure. These and other features of the invention, its operating advantages and the specific objects obtained by its use will be more fully understood from the following detailed description and accompanying drawings in which preferred embodiments of the invention are illustrated and described.

As used herein and in the claims, terms of orientation and position, such as "upper", "lower", "inner", "outer", "right", "left", "vertical", "horizontal", "top", "bottom", and similar terms, are used to describe the invention as oriented in the drawings. Unless otherwise indicated, the use of such terms is not intended to represent a limitation upon the scope of the invention, in that the invention may adopt alternative positions and orientations.

Unless otherwise indicated, all numbers or expressions, such as those expressing structural dimensions, quantities of ingredients, etc. used in the specification and claims are understood as modified in all instances by the term "about".

BRIEF DESCRIPTION OF THE DRAWINGS

In FIGS. 1 through 14, like reference numerals designate the same components and structural features, unless otherwise indicated.

DETAILED DESCRIPTION OF THE INVENTION

Figure 1:
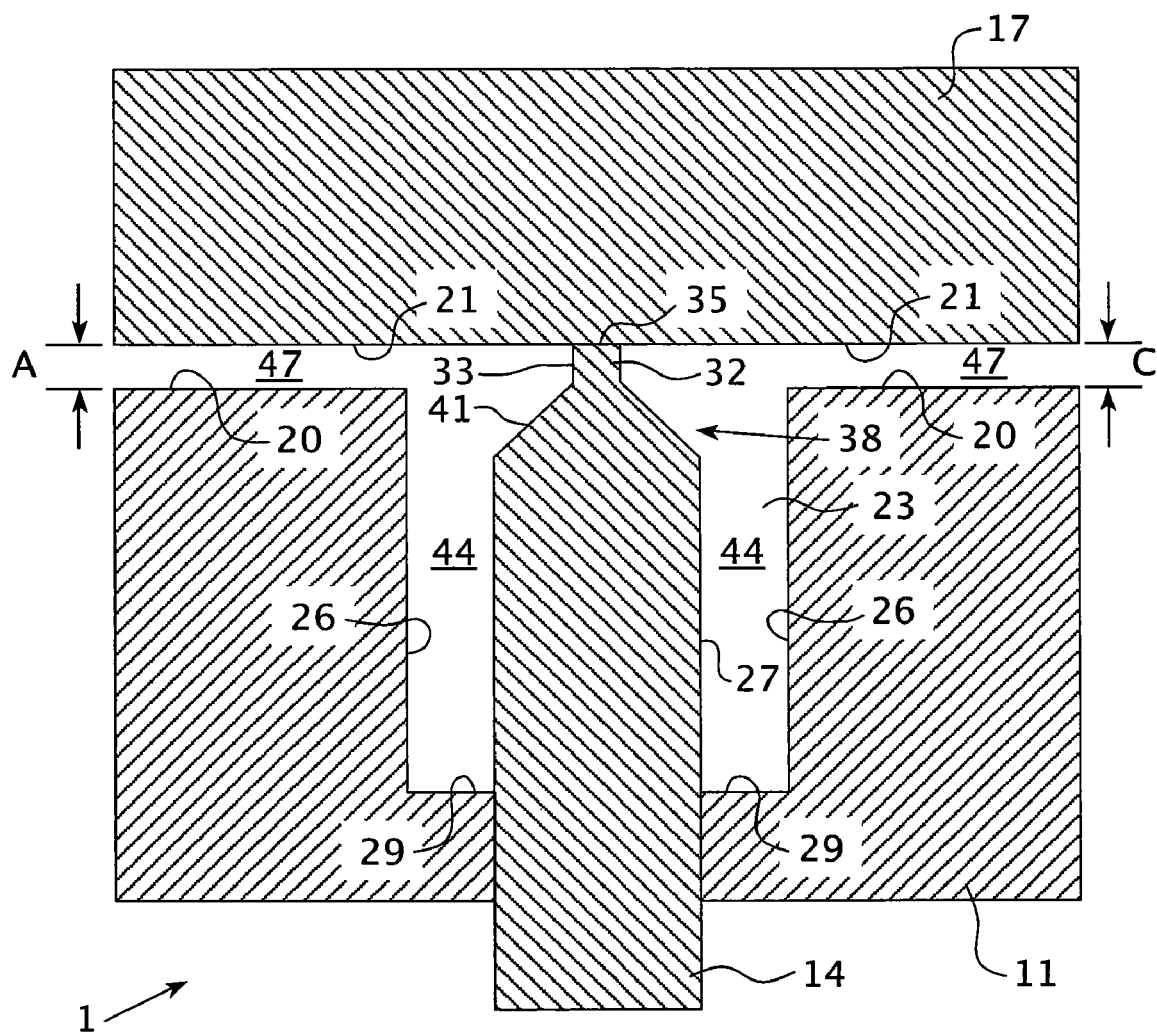
FIG. 1 is a representative sectional view of a mold apparatus used in the method of the present invention.

With reference to FIG. 1, the method of the present invention involves providing a mold apparatus (or assembly) 1 that includes a first mold portion 11 having a slide 14 therein, and a second mold portion 17. First mold portion 11 has an interior surface 20, and further includes at least one recess 23 having an internal surface 26. More particularly, internal surface 26 of recess 23 includes sidewalls 26 and a base 29 which together define recess 23. Slide 14 is located within recess 23 of first mold portion 11. Second mold portion 17 has an interior surface 21.

First mold portion 11 and second mold portion 17 are reversibly positionable relative to each other. One of first mold portion 11 or second mold portion 17 may be moveable, while the other is stationary. Alternatively, both first mold portion 11 and second mold portion 17 may be moveable. Typically, first mold portion 11 is stationary (e.g., relative to vertical movement) while second mold portion 17 is moveable (e.g., vertically) relative to first mold portion 11. The first and second mold portions may be reversibly positioned by known methods, for example, manually or mechanically. Typically, the mold portions are reversibly positioned by mechanical means, for example, by hydraulically driven drive-arms (not shown) along rails or tubular guides (not shown), in accordance with art-recognized methods.

Figure 3:
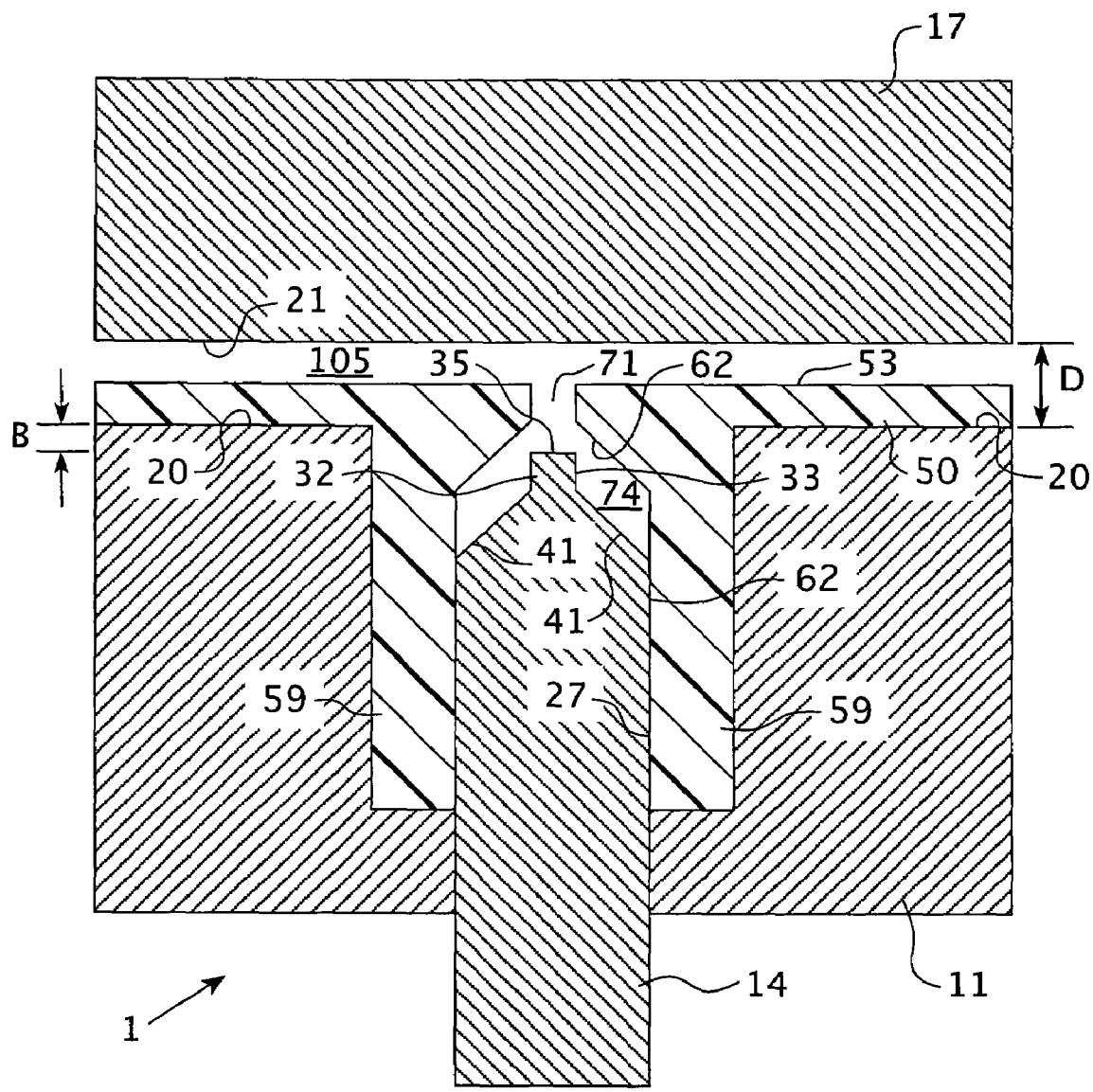
FIG. 3 is a representative sectional view of the mold apparatus of FIG. 2 with the second mold portion positioned to form a second mold cavity, and the slide retracted within the molded extension so as to form a retainer cavity.

Slide 14 has an exterior surface 27, and a distal extension 32 which has a forward surface 35 and an exterior surface 33. Distal extension 32 is located at the top (e.g., 38) of slide 14. Slide 14 is reversibly positionable between at least a first slide position A (as depicted in FIG. 1) and a second slide position B (as depicted in FIG. 3). First slide position A and second slide position B are depicted in FIGS. 1 and 3 with regard to the position of forward surface 35 of distal extension 32 relative to interior surface 20 of first mold portion 11. Slide 14 may be moved manually or mechanically. Typically, slide 14 is moved mechanically, for example hydraulically by means of a drive-arm (not shown).

Slide 14 may have any suitable shape, provided it is slidingly and reversibly positionable within recess 23 throughout the mold formation of the first and second molded sections of the molded article. As will be discussed in further detail herein, the shape of slide 14 (as defined by exterior surface 27 thereof) determines the shape of the interior surface of the molded extension which is formed there-against. As such, the need for slide 14 to be slidingly and reversibly positionable within recess 23, and the desired shape of the interior surface of the molded extensions are both typically taken into consideration when selecting the shape of slide 14. Generally, slide 14 is substantially tubular in shape, having a cross sectional shape selected from circular shapes (in which case slide 14 is a substantially cylindrical slide), oval shapes (e.g., ellipsoid shapes), polygonal shapes (e.g., triangles, rectangles, squares, pentagons, hexagons, heptagons, octagons, etc.) and combinations thereof. As depicted in FIG. 1, slide 14 has a substantially cylindrical slide having a conical upper portion 38 that includes a tapered surface 41 that is tapered toward distal extension 32.

The components of the mold apparatus used in the method of the present invention may be fabricated from suitable materials that are known to the skilled artisan. Typically, the components of the mold apparatus (e.g., the first mold portion, the second mold portion, and the slide) are fabricated from metals, such as steel (e.g., tool steel). The molding surfaces of the slide, and the interior surfaces of the first and second mold portions may each independently be selected from polished steel surfaces, stainless steel surfaces, plated nickel surfaces, nickel/polytetrafluoroethylene surfaces and combinations thereof.

In an embodiment of the method of the present invention, slide 14 is positioned in first slide position A, such that distal extension 32 extends beyond interior surface 20 of first mold portion 11, as depicted in FIG. 1. In particular, while in first slide position A, forward surface 35 of distal extension 32 extends beyond (e.g., above) interior surface 20 of first mold portion 11. When in first slide position A, the internal surface 26 (e.g., sidewall 26 and base 29) of recess 23 and at least a portion of exterior surface 27 (e.g., sidewall 27, tapered surface 41, and optionally a portion of exterior surface 33 of distal extension 32) together define an extension cavity 44.

First mold portion 11 and second mold portion 17 are positioned, in an embodiment of the present invention, in a first mold position C (FIG. 1), such that interior surface 20 of first mold portion 11 and interior surface 21 of second mold portion 17 together define a first mold cavity 47. First mold cavity 47 is in fluid communication with extension cavity 44. When first mold portion 11 and second mold portion 17 are positioned in first mold position C, forward surface 35 of distal extension 32 of slide 14 abuts a portion of interior surface 21 of second mold portion 17.

A first plastic material is introduced into first mold cavity 47 such that the first plastic material is also introduced or passes into extension cavity 44. In the various embodiments of the method of the present invention, the first and second plastic materials are each separately and independently introduced into the mold (e.g., the first and/or second mold cavities, or the first mold portion) in a fluid form (e.g., a free flowing granulated/particulate form, a liquid form or a molten form). When the plastic material is a thermoplastic material, it is typically introduced into the mold as a molten thermoplastic material having a temperature greater than the melting point thereof. If the plastic material is a thermosetting plastic material, it is typically introduced into the mold in a liquid form. If the first plastic material is in the form of a thermoplastic or thermosetting free flowing particulate material, it may be introduced into the mold in a free flowing particulate form, and subsequently transformed to a liquid or molten form by the application of elevated temperature.

While the first plastic material may be introduced into the first mold cavity at neutral or ambient pressure, it is typically introduced at elevated pressure so as to facilitate substantially filling the first mold cavity 47 and the extension cavity 44. The pressure at which the first plastic material is introduced into first mold cavity generally depends in part on the viscosity of the first plastic material, e.g., a higher viscosity plastic material will typically require a higher injection pressure. In an embodiment of the present invention, a thermoplastic material (e.g., thermoplastic polyethylene), is introduced into first mold cavity 47 at an injection pressure of from 1000 psi to 50,000 psi (70 to 3515 Kg/cm$^2$), and more typically at a pressure of from 10,000 psi to 20,000 psi (703 to 1406 Kg/cm$^2$).

Figure 2:
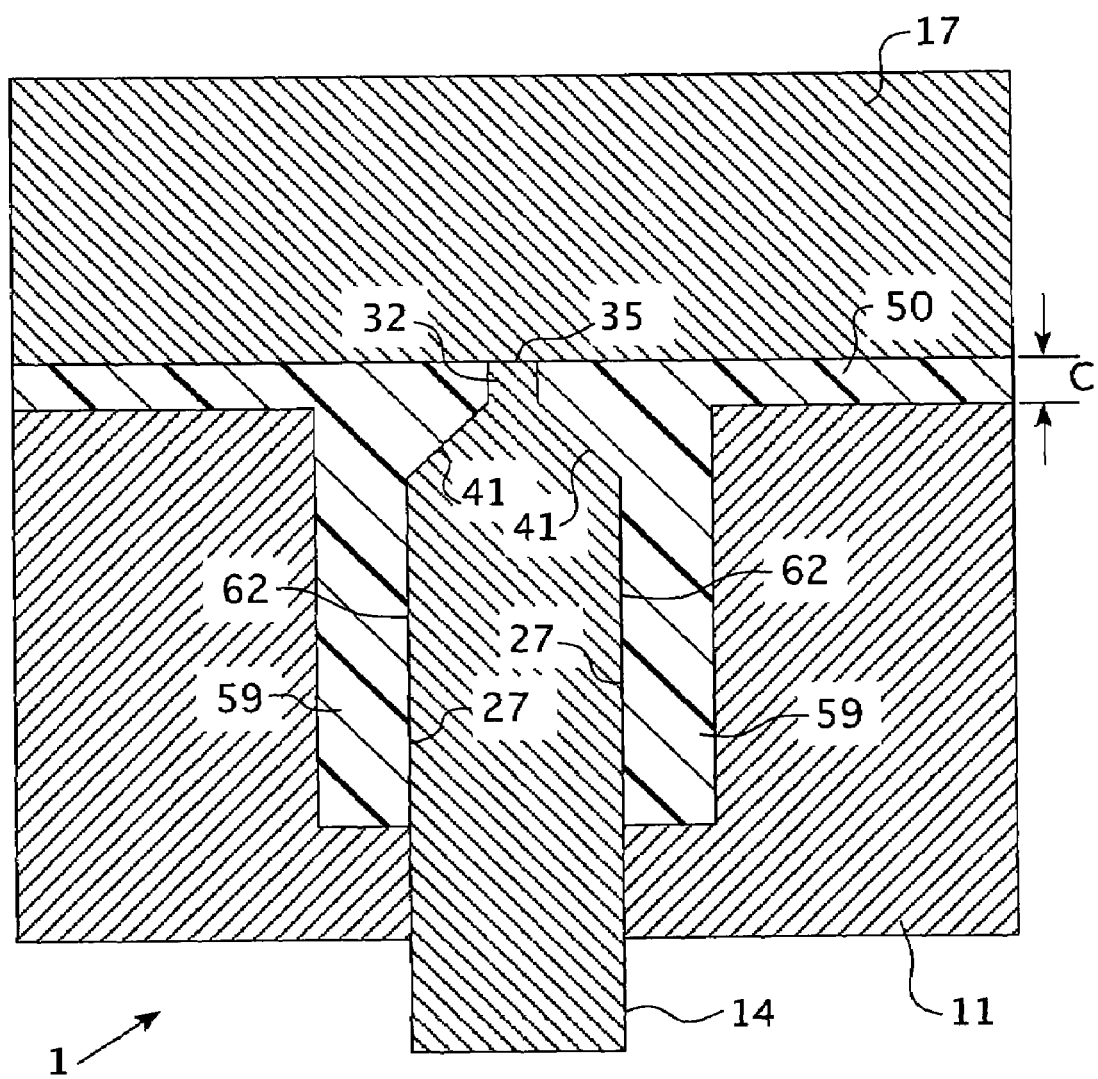
FIG. 2 is a representative sectional view of the mold apparatus of FIG. 1 with a first plastic material introduced therein so as to form a first molded section.
Figure 5:
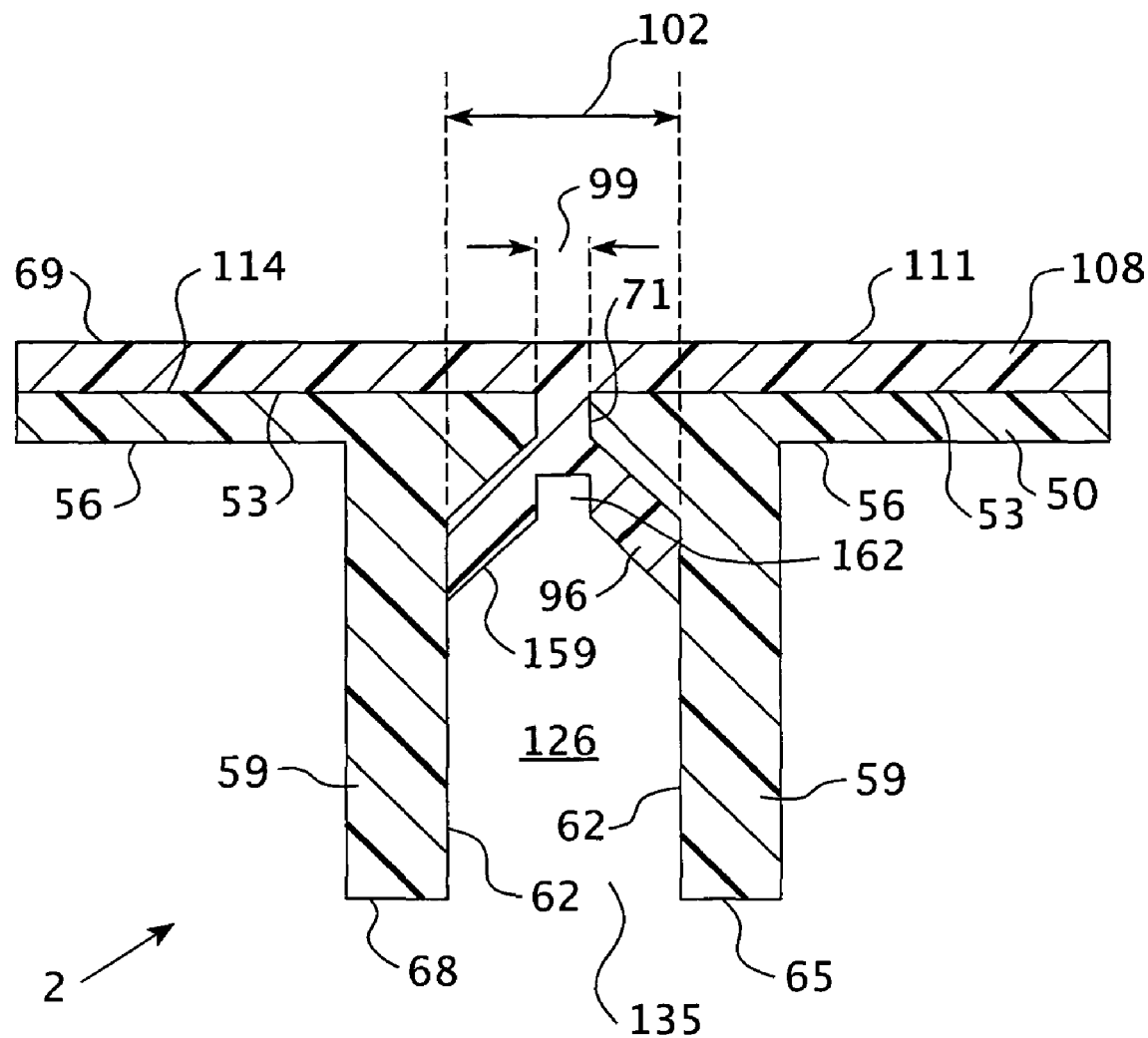
FIG. 5 is a representative sectional view of a molded article according to the present invention.

After introduction into first mold cavity 47, and extension cavity 44, the first plastic material is allowed to at least partially solidify, thus forming a first molded section 50 (FIG. 2) of the molded article 2 (FIG. 5). First molded section 50 includes a first surface 53 and a second surface 56, which are opposed one from the other. First molded section 50 further includes at least one molded extension 59, which extends from second surface 56 thereof. Molded extension 59 is formed within extension cavity 44, is continuous with first molded section 50, and has an internal surface 62. Upon its formation, internal surface 62 of molded extension 59 abuts at least a portion of exterior surface 27 (e.g., sidewall 27 and tapered surface 41) of slide 14. As depicted in FIGS. 2 and 5, molded extension 59 more particularly has a first prong 65 and a second prong 68, which each extend from second surface 56 of first molded section 50.

Allowing the first plastic material to at least partially solidify, and preferably substantially completely solidify, prior to introduction of the second plastic material into the mold, as will be discussed further herein, is important for purposes of minimizing and preferably eliminating: (i) the occurrence of sink mark defects in the first (forward or exterior) surface 69 of the molded article 2; and optionally (ii)

warping defects in the molded article of the present invention. When the first plastic material is a thermoplastic material, solidification thereof upon cooling below its melting point is typically accompanied by dimensional shrinkage. Some thermosetting plastic materials undergo dimensional shrinkage upon cure, while others undergo some dimensional expansion upon cure. While not intending to be bound by any theory, and based on the evidence at hand, it is believed that shrinkage of the plastic material results in formation of surface defects, such as sink marks, in the surface forward of (or opposite to) a thicker section of the molded article, such as a section that includes molded extensions. In addition, shrinkage and/or expansion of the plastic material may result in the formation of warping defects in such a forward surface and/or throughout other areas of the molded article.

Figure 6:
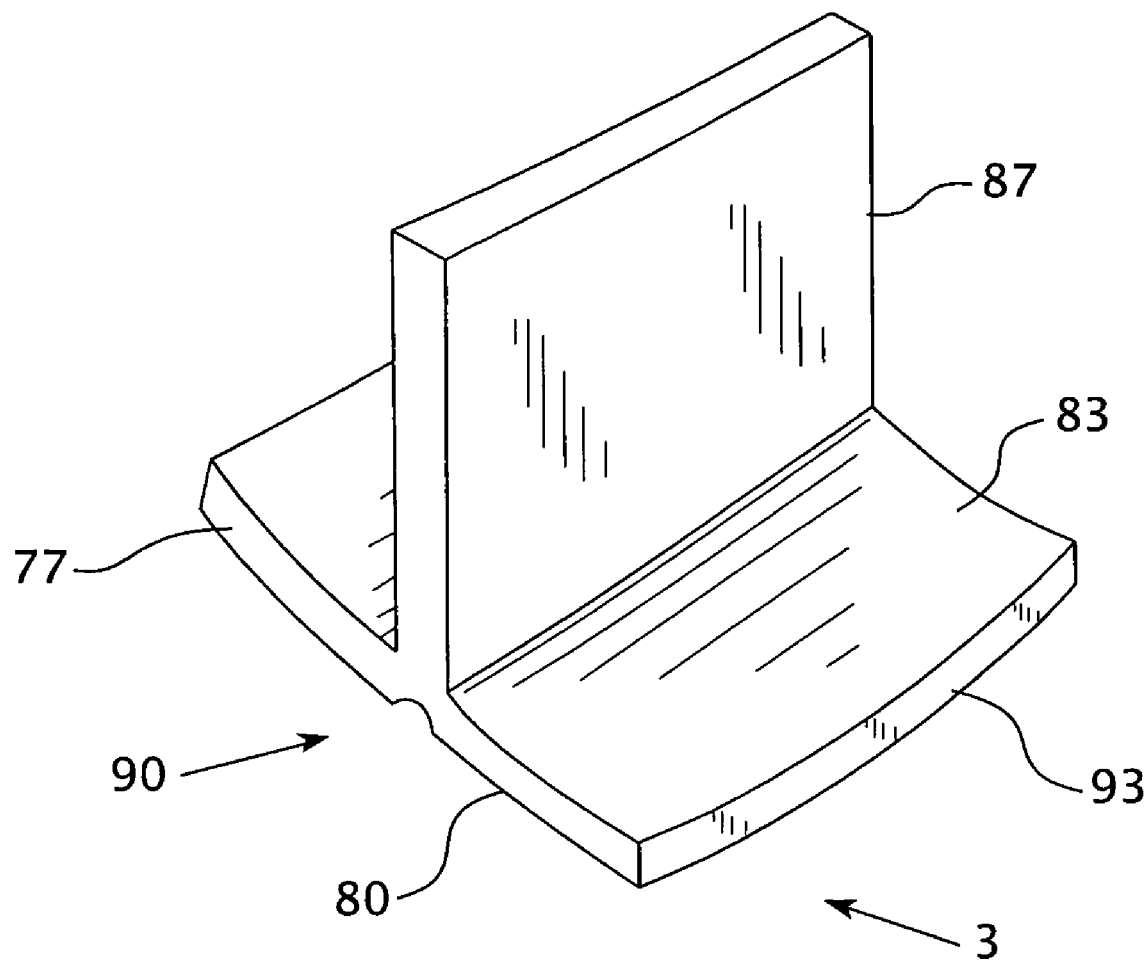
FIG. 6 is a representative perspective view of a prior art molded article, having a molded extension, which exhibits both sink mark and warping defects.

With reference to FIG. 6, and for purposes of illustration, there is depicted a prior art molded plastic article 3 that includes a base portion 77 having a first surface 80, a second surface 83, and a molded extension 87 extending from second surface 83 of base portion 77. Molded article 3 includes a sink mark defect 90 located in first surface 80 of base portion 77, and substantially opposite of molded extension 87. Sink mark defects are typically characterized by a depression (e.g., a conical depression) in the first (or forward) surface of a molded article, and are typically located opposite of a molded extension extending from the second (or rear) surface of the molded article. Molded article 3 also includes warping defects in first surface 80 and second surface 83 of base 77, which is observable along side 93 of base portion 77. Warping defects are typically characterized by bending or curvature of a portion of the molded article, which is usually, but not necessarily proximate to a molded extension. Molded article 3 is representative of a prior art unitary thermoplastic molded article in which molded extension 87 and base portion 77 are formed substantially concurrently during the molding process (e.g., injection or compression molding) and are continuous with each other.

The presence (or absence) of sink mark defects is typically determined and evaluated by visual inspection of the first surface of the molded article. Sink mark defects may also be identified and evaluated by more quantifiable methods. For example, alternatively or in addition to visual inspection, profile data (e.g., obtained using a profilometer) of the first surface of the molded article may be obtained and evaluated to determine the presence, location and degree of sink mark defects, in accordance with art-recognized methods. The presence (or absence) of warping defects is typically determined and evaluated by visual inspection of the molded article. In the case of flat surfaces, warping may be further determined and evaluated by means of a level (e.g., a bubble level) placed on various points of the molded surface. In the case of non-flat surfaces (e.g., curved surfaces), warping may be identified and evaluated by means of determining the degree of fit between the non-flat surface and a template placed in contact therewith, in accordance with art-recognized methods.

In an embodiment of the present invention, the first plastic material is a thermoplastic material, and after introduction into the mold (e.g., the first mold cavity, or the first mold portion) and the extension cavity (and prior to introduction of the second plastic material into the mold), it is allowed to cool to a temperature T' that represents a reduction below the melting point of the thermoplastic material that is at least 85 percent (e.g., at least 90 percent, or from 85 to 90 percent) of the difference between the melting point of the thermoplastic material and 25° C. The following Equation-I is provided for purposes of illustration.

$$T' = (\text{Melting Point } °C.) - (x/100)(\Delta T° C.) \qquad \text{Equation-I}$$

wherein $\Delta T = (\text{Melting Point } °C. - 25° C.)$

In Equation I, the term "Melting Point" refers to the melting point of the thermoplastic material, which is greater than 25° C., and "x" represents a percent value from 0 to 100 percent (i.e., x is a number, including fractional numbers, from 0 to 100). For example, when the thermoplastic material of the first plastic material has a melting point of 137° C., Equation-I may be represented by the following Equation-II.

$$T' = (137° C.) - (x/100)(112° C.) \qquad \text{Equation-II}$$

With reference to Equation-II, when the thermoplastic material is allowed to cool to a temperature T' that represents a reduction below the melting point of the thermoplastic material that is at least 85 percent of the difference between the melting point of the thermoplastic material and 25° C., x is 85, and accordingly T' is 41.8° C. When the temperature reduction is 100 percent, x is 100, and accordingly T' is 25° C.

In an embodiment of the present invention, the first plastic material is a thermoplastic material, which is allowed to substantially completely solidify prior to introduction of the second plastic material into the mold (e.g., into second mold cavity 105 and retainer cavity 74). Complete solidification may be achieved by allowing the thermoplastic material of the first plastic material to cool to a temperature T' that is that represents a reduction below the melting point of the thermoplastic material that is 100 percent of the difference between the melting point of the thermoplastic material and 25° C. (i.e., T'=25° C.). Substantially complete solidification of the thermoplastic material of the first plastic material is desirable because it is typically accompanied by cessation of shrinkage thereof (i.e., shrinkage of the plastic material being substantially complete). Complete solidification of the first plastic material, however, may result in an undesirable increase in process cycle time, with an accompanying increase in production costs, due to increased cooling times.

In a further embodiment of the present invention, the first plastic material introduced into the mold (e.g., into first mold cavity 47, or first mold portion 11) is a thermoplastic material, which is allowed to cool to a temperature such that shrinkage of the first plastic material is substantially complete prior to introduction of the second plastic material in the mold (e.g., second mold cavity 105 and retainer cavity 74). Allowing the thermoplastic material of the first plastic material to cool to a temperature that is accompanied by substantially complete shrinkage is desirable when such temperature is greater than room temperature (e.g., >25° C.) for reasons that include reducing process cycle time and correspondingly reducing/optimizing related production costs. Such a temperature may be determined in accordance with Equation-I herein, in which x is 85 to 90, inclusive of the recited values.

Shrinkage of a plastic material as a function of temperature, and accordingly temperatures at which shrinkage of a plastic material is substantially complete, may be determined in accordance with art recognized methods. For example, temperatures at which shrinkage of the first plastic material is substantially complete may be determined in accordance with ASTM D 955-00. In addition, temperatures at which shrinkage is substantially complete may be determined experimentally by means of trial and error, for example, determining under what conditions a substantial absence of sink-mark defects is achieved.

After the first plastic material has been allowed to at least partially solidify within the mold, slide 14 is retracted to second slide position B (FIG. 3). When in second slide position B, forward surface 35 of distal extension 32 of slide 14 resides below first surface 20 of first mold portion 11. Retraction of slide 14 to second slide position B results in the formation of an aperture 71 in first surface 53 of first molded section 50. In addition, retraction of slide 14 into second slide position B results in positioning the conical upper portion 38 thereof within molded extension 59, such that forward surface 35 of distal extension 32, a portion of exterior surface 27 of slide 14 (in particular tapered surface 41 of conical upper portion 38 and exterior surface 33 of distal extension 32) and a portion of internal surface 62 of molded extension 59 together define a retainer cavity 74. Retainer cavity 74 is in fluid communication with aperture 71.

Figure 10:
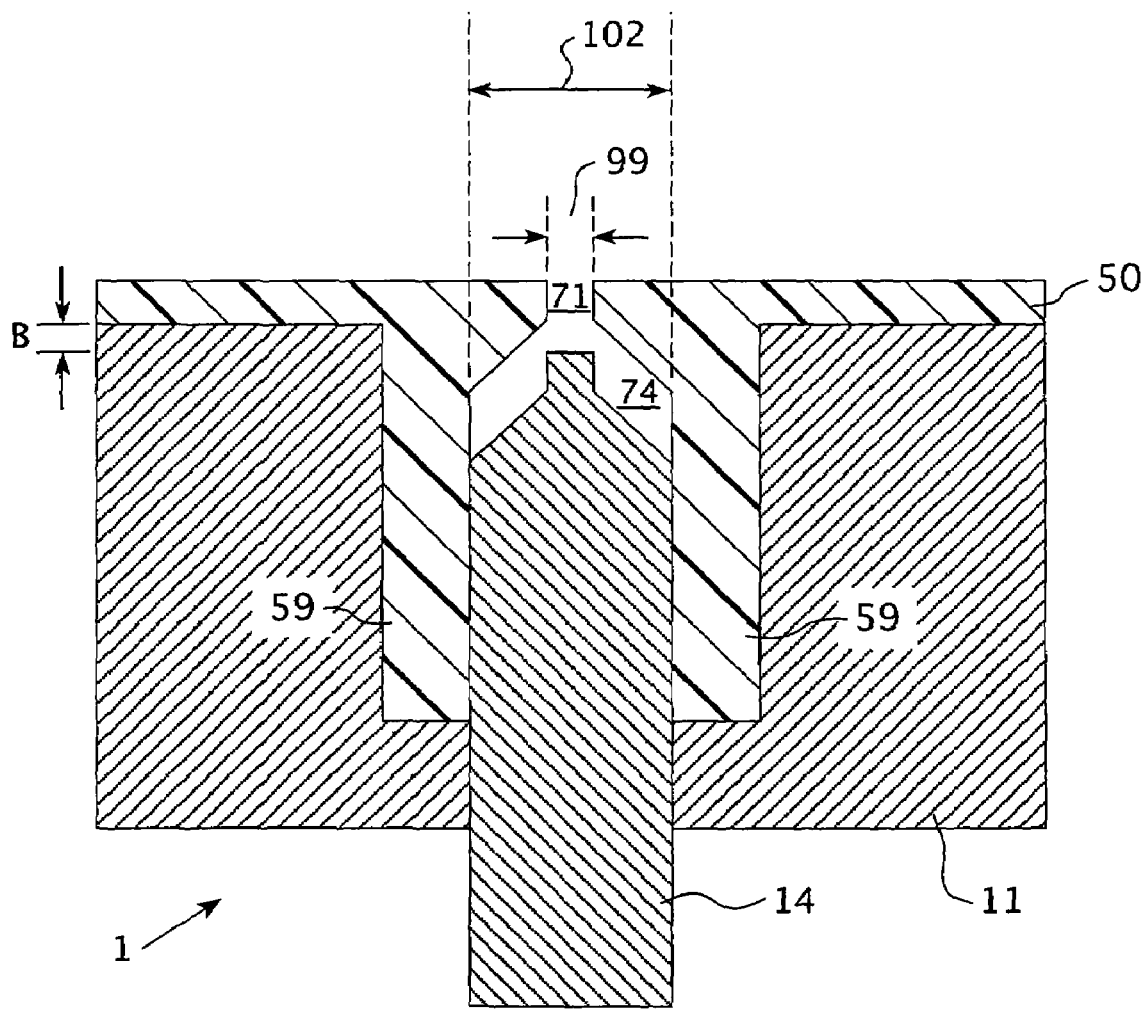
FIG. 10 is a representative sectional view of a portion of the mold apparatus of FIG. 3 showing the relative lateral dimensions of the aperture in the first surface of the first molded section and the retainer cavity.

With reference to FIG. 10, retainer cavity 74 has a lateral dimension 102 that is greater than a lateral dimension 99 of aperture 71. The difference in the lateral dimensions of aperture 71 and retainer cavity 74 is selected so as to allow for the formation of a retainer 96 (FIGS. 4 and 5) within retainer cavity 74 that will not slip or otherwise slide through aperture 71, and which is retained within retainer space 126 of extension 59 after its formation (as will be discussed in further detail herein). Aperture 71 may have any suitable cross sectional shape (e.g., polygonal, circular, oval, irregular or combinations thereof). In addition, aperture 71 may be elongated, for example, in the form of an elongated slot. Retainer cavity 74 may have any suitable shape, provided that it is dimensioned so as to prevent retainer 96, which is formed therein, from sliding through aperture 71, and accordingly such that retainer 96 is retained within retainer space 126 of molded extension 59 (e.g., lateral dimension 102 of retainer cavity 74 being greater than lateral dimension 99 of aperture 71). For example, retainer cavity 74 (and accordingly retainer 96) may have a shape selected from annular shapes, elongated shapes, irregular shapes or combinations thereof.

After formation of first molded section 50, and prior to, concurrently with or after retraction of slide 14 to second slide position B, first mold portion 11 and second mold portion 17 are positioned in a second mold position D. See FIG. 3. When in second mold position D, interior surface 21 of second mold portion 17 and first surface 53 of first molded section 50 together define a second mold cavity 105. Second mold cavity 105 is in fluid communication with aperture 71 and accordingly with retainer cavity 74.

A second plastic material is introduced into second mold cavity 105, and a portion thereof passes through aperture 71 and at least partially fills retainer cavity 74. While the second plastic material may be introduced into the second mold cavity at neutral or ambient pressure, it is typically introduced at elevated pressure so as to facilitate substantially filling second mold cavity 105 and retainer cavity 74. The pressure at which the second plastic material is introduced into the second mold cavity generally depends in part on the viscosity of the second plastic material, e.g., a higher viscosity plastic material will typically require a higher injection pressure. In an embodiment of the present invention, a thermoplastic material (e.g., thermoplastic polyethylene) is introduced into second mold cavity 105 at an injection pressure of from 1000 psi to 50,000 psi (70 to 3515 Kg/cm$^2$), and more typically at a pressure of from 10,000 psi to 20,000 psi (703 to 1406 Kg/cm$^2$).

After introduction into second mold cavity 105, the second plastic material is allowed to at least partially solidify thus forming second molded section 108 that includes a first surface 111, a second surface 114 and retainer 96. As discussed previously herein, retainer 96 is formed within retainer cavity 74 and is continuous with second molded section 108 through aperture 71. At least a portion of retainer 96 abuts at least a portion of internal surface 62 of molded extension 59. In addition, retainer 96 resides within retainer space 126 of molded extension 59.

After formation of second molded section 108, molded article 2 is removed from mold 1. For example, first mold portion 11 and second mold portion 17 are typically separated from each other, and molded article 2 is removed from mold 1 by means of one or more ejector pins (not shown) pressing up against second surface 56 of first molded section 50. Alternatively, or in addition to ejector pins, molded article 2 may be removed from mold 1 by slide 14 being moved up against retainer 96 (e.g., repositioned to first slide position A), thereby removing or ejecting molded article 2 from the mold.

With the molded article (e.g., molded article 2), prepared in accordance with the methods of the present invention, at least a portion of second surface 114 of second molded section 108 abuts at least a portion of first surface 53 of first molded section 50. Second molded section 108 and first molded section 50 are fixedly attached to each other by at least one retainer 96. The first surface 69 of molded article 2, which is defined by first surface 111 of second molded article 108, is substantially free of sink mark defects, opposite each molded extension 59. In addition to being substantially free of sink mark defects, molded articles prepared in accordance with the present invention are typically also substantially free of warping defects.

Fusion (e.g., melt fusion) and/or covalent bond formation may occur between the abutting first surface 53 of first molded section 50 and second surface 114 of second molded section 108 of molded article 2, in the method of the present invention. For example, if the first and second plastic materials are both thermoplastic materials, introduction of the second plastic material into the mold in a molten form may result in some melt-fusion upon contact thereof with first surface 53 of first molded article 50. For purposes of further illustration, if the first and second plastic materials are each thermosetting plastic materials, covalent bond formation may occur between first surface 53 and second surface 114 when the second plastic material is introduced into the mold prior to complete cure of the first plastic material.

In accordance with the present invention, the molded article includes at least one retainer, and preferably includes a plurality of retainers (e.g., 2, 3, 4, 5, 6 or more retainers). The plurality of retainers may be positioned randomly, regularly (e.g., geometrically) or a combination thereof, throughout the molded article. In an embodiment of the present invention, in addition to including at least one recess that includes a slide, the first mold portion (e.g., first mold portion 11) includes at least one recess (e.g., similar to recess 23) that does not include a slide (e.g., slide 14) therein. Such slide-free recesses (not shown) result in the formation of molded extensions that do not include or are not associated with a retainer (i.e., retainer-free molded extensions). Examples of retainer-free molded extensions, include but are not limited to: structural supports, such as ribs (not shown) and posts (e.g., post 117); and mounting supports, such as bosses 120 and 123 of molded article 2 of FIG. 7. As such, in an embodiment of the present invention, the molded article further includes at least one retainer-free molded extension.

The molded extensions of the present invention may be selected from molded structural supports, molded mounting supports and combinations thereof. Structural supports provide the molded article with structural or dimensional stability, and include, but are not limited to, ribs and/or posts.

Mounting supports provide a means by which the molded article may be attached to a separate article, such as a frame (e.g., an underlying space frame). A non-limiting example of a mounting support is a boss that may optionally include threading dimensioned for engagement with fasteners, such as bolts and screws. In some instances, a structural support may also serve as a mounting support. For example, a rib may also be used to attach the molded article to a separate article, such as a frame.

The first and second plastic materials that are introduced into the mold may each independently be selected from thermosetting plastic materials and/or thermoplastic materials. As used herein and in the claims, the term "thermosetting plastic material" and similar terms, such as "thermoset plastic materials" means plastic materials having or that form a three dimensional crosslinked network resulting from the formation of covalent bonds between chemically reactive groups, e.g., active hydrogen groups and free isocyanate groups. Thermoset plastic materials from which the first and second plastic materials may each be independently selected, include those known to the skilled artisan, e.g., crosslinked polyurethanes, crosslinked polyepoxides and crosslinked polyesters (such as sheet molding compound compositions). The use of thermosetting plastic materials typically involves the art-recognized process of reaction injection molding. Reaction injection molding typically involves, as is known to the skilled artisan, injecting separately, and preferably simultaneously, into a mold: (i) an active hydrogen functional component (e.g., a polyol and/or polyamine); and (ii) an isocyanate functional component (e.g., a diisocyanate such as toluene diisocyanate, and/or dimers and trimers of a diisocyanate such as toluene diisocyanate). The filled mold may optionally be heated to ensure and/or hasten complete reaction of the injected components.

As used herein and in the claims, the term "thermoplastic material" and similar terms, means a plastic material that has a softening or melting point, and is substantially free of a three dimensional crosslinked network resulting from the formation of covalent bonds between chemically reactive groups, e.g., active hydrogen groups and free isocyanate groups. Examples of thermoplastic materials from which the first and second plastic materials may each be independently selected include, but are not limited to, thermoplastic polyurethane, thermoplastic polyurea, thermoplastic polyimide, thermoplastic polyamide, thermoplastic polyamideimide, thermoplastic polyester, thermoplastic polycarbonate, thermoplastic polysulfone, thermoplastic polyketone, thermoplastic polyolefins, thermoplastic (meth)acrylates, thermoplastic acrylonitrile-butadiene-styrene, thermoplastic styrene-acrylonitrile, thermoplastic acrylonitrile-stryrene-acrylate and combinations thereof (e.g., blends and/or alloys of at least two thereof).

In an embodiment of the present invention, the first and second plastic materials are each independently selected from thermoplastic polyolefins. As used herein and in the claims, the term "polyolefin" and similar terms, such as "polyalkylene" and "thermoplastic polyolefin", means polyolefin homopolymers, polyolefin copolymers, homogeneous polyolefins and/or heterogeneous polyolefins. For purposes of illustration, examples of a polyolefin copolymers include those prepared from ethylene and one or more $C_3$-$C_{12}$ alpha-olefins, such as 1-butene, 1-hexene and/or 1-octene.

The polyolefins, from which the first and second plastic materials may each be independently selected, include heterogeneous polyolefins, homogeneous polyolefins, or combinations thereof. The term "heterogeneous polyolefin" and similar terms means polyolefins having a relatively wide variation in: (i) molecular weight amongst individual polymer chains (i.e., a polydispersity index of greater than or equal to 3); and (ii) monomer residue distribution (in the case of copolymers) amongst individual polymer chains. The term "polydispersity index" (PDI) means the ratio of $M_w/M_n$, where $M_w$ means weight average molecular weight, and $M_n$ means number average molecular weight, each being determined by means of gel permeation chromatography (GPC) using appropriate standards, such as polyethylene standards. Heterogeneous polyolefins are typically prepared by means of Ziegler-Natta type catalysis in heterogeneous phase.

The term "homogeneous polyolefin" and similar terms means polyolefins having a relatively narrow variation in: (i) molecular weight amongst individual polymer chains (i.e., a polydispersity index of less than 3); and (ii) monomer residue distribution (in the case of copolymers) amongst individual polymer chains. As such, in contrast to heterogeneous polyolefins, homogeneous polyolefins have similar chain lengths amongst individual polymer chains, a relatively even distribution of monomer residues along polymer chain backbones, and a relatively similar distribution of monomer residues amongst individual polymer chain backbones. Homogeneous polyolefins are typically prepared by means of single-site, metallocene or constrained-geometry catalysis. The monomer residue distribution of homogeneous polyolefin copolymers may be characterized by composition distribution breadth index (CDBI) values, which are defined as the weight percent of polymer molecules having a comonomer residue content within 50 percent of the median total molar comonomer content. As such, a polyolefin homopolymer has a CDBI value of 100 percent. For example, homogenous polyethylene/alpha-olefin copolymers typically have CDBI values of greater than 60 percent or greater than 70 percent. Composition distribution breadth index values may be determined by art recognized methods, for example, temperature rising elution fractionation (TREF), as described by Wild et al, Journal of Polymer Science, Poly. Phys. Ed., Vol. 20, p. 441 (1982), or in U.S. Pat. No. 4,798,081, or in U.S. Pat. No. 5,089,321. An example of homogeneous ethylene/alpha-olefin copolymers are SURPASS polyethylenes, commercially available from NOVA Chemicals Inc.

The first and second plastic materials may each independently and optionally include a reinforcing material selected, for example, from glass fibers, glass beads, carbon fibers, metal flakes, metal fibers, polyamide fibers (e.g., KEVLAR polyamide fibers), cellulosic fibers, nanoparticulate clays, talc and mixtures thereof. If present, the reinforcing material is typically present in a reinforcing amount, e.g., in an amount of from 5 percent by weight to 60 or 70 percent by weight, based on the total weight of the plastic material. The reinforcing fibers, and the glass fibers in particular, may have sizings on their surfaces to improve miscibility and/or adhesion to the plastic materials into which they are incorporated, as is known to the skilled artisan.

In an embodiment of the invention, the reinforcing material is in the form of fibers (e.g., glass fibers, carbon fibers, metal fibers, polyamide fibers, cellulosic fibers and combinations of two or more thereof). The fibers typically have lengths (e.g., average lengths) of from 0.5 inches to 4 inches (1.27 cm to 10.16 cm). The molded article of the present invention typically includes fibers having lengths that are at least 50 or 85 percent of the lengths of the fibers that are present in the feed materials from which the molded article is prepared, such as from 0.25 inches to 2 or 4 inches (0.64 cm to 5.08 or 10.16 cm). The average length of fibers present in the molded article may be determined in accordance with art recognized methods. For example, the molded article may be pyrolyzed to remove the plastic material, and the remaining or residual fibers microscopically analyzed to determine their average lengths, as is known to the skilled artisan.

Fibers are typically present in the first and/or second plastic materials in amounts independently from 5 to 70 percent by weight, 10 to 60 percent by weight, or 30 to 50 percent by weight (e.g., 40 percent by weight), based on the total weight of the plastic material (i.e., the weight of the plastic material, the fiber and any additives). Accordingly, the molded article of the present invention may include fibers in amounts of from 5 to 70 percent by weight, 10 to 60 percent by weight, or 30 to 50 percent by weight (e.g., 40 percent by weight), based on the total weight of the molded article.

The fibers may have a wide range of diameters. Typically, the fibers have diameters of from 1 to 20 micrometers, or more typically from 1 to 9 micrometers. Generally each fiber comprises a bundle of individual filaments (or monofilaments). Typically, each fiber is composed of a bundle of 10,000 to 20,000 individual filaments.

Typically, the fibers are uniformly distributed throughout the plastic material. During mixing of the fibers and the plastic material, the fibers generally form bundles of fibers typically comprising at least 5 fibers per fiber bundle, and preferably less than 10 fibers per fiber bundle. While not intending to be bound by theory, it is believed, based on the evidence at hand, that fiber bundles containing 10 or more fibers may result in a molded article having undesirably reduced structural integrity. The level of fiber bundles containing 10 or more fibers per bundle, may be quantified by determining the Degree of Combing present within a molded article. The number of fiber bundles containing 10 or more fibers per bundle is typically determined by microscopic evaluation of a cross section of the molded article, relative to the total number of microscopically observable fibers (which is typically at least 1000). The Degree of Combing is calculated using the following equation: 100×((number of bundles containing 10 or more fibers)/(total number of observed fibers)). Generally, molded articles according to the present invention have a Degree of Combing of less than or equal to 60 percent, and typically less than or equal to 35 percent.

In addition or alternatively to reinforcing material(s), the first and second plastic materials may each independently and optionally include one or more additives. Additives that may be present in the first and/or second plastic material include, but are not limited to, antioxidants, colorants, e.g., pigments and/or dyes, mold release agents, fillers, e.g., calcium carbonate, ultraviolet light absorbers, fire retardants and mixtures thereof. Additives may be present in the plastic material in functionally sufficient amounts, e.g., in amounts independently from 0.1 percent by weight to 10 percent by weight, based on the total weight of the plastic material.

In an embodiment of the present invention, the first and second mold portions may optionally be further positioned so as to compress the first plastic material that has been introduced into the first mold cavity (e.g., 47) and the extension cavity (e.g., 44). Alternatively, or in addition thereto, the first and second mold portions may be further positioned so as to compress the second plastic material that has been introduced into the second mold cavity (e.g., 105) and the retainer cavity (e.g., 74). Such optional post-injection compression of the first plastic material may be undertaken for purposes including, but not limited to: ensuring sufficient spreading of the plastic material over the internal surface of the mold (e.g., interior surfaces 20 and 21); ensuring sufficient filling of extension cavity 44; and/or expelling entrapped gas (e.g., air) from the first plastic material. Likewise, optional post-injection compression of the second plastic material may be under-taken for purposes including, but not limited to: ensuring sufficient spreading of the plastic material over contact surfaces (e.g., interior surface 21 of second mold portion 17, and first surface 53 of first molded section 50); ensuring sufficient filling of retainer cavity 74; and/or expelling entrapped gas (e.g., air) from the second plastic material. Entrapped gasses, such as air, may be removed from the mold during the optional compression step(s) by means of vents (not shown), as is known to the skilled artisan.

In accordance with the present invention there is further provided a method of forming a molded article by means of compression molding, that involves providing a mold substantially as described previously herein, for example mold apparatus 1 of FIG. 1. With the compression molding method of the present invention, mold apparatus 1 includes a first mold portion 11 having a reversibly positionable slide 14 therein, and a second mold portion 17 having an internal surface 21. First mold portion 11 has an interior surface 20, and further includes at least one recess 23 having an internal surface 26. More particularly, internal surface 26 of recess 23 includes sidewalls 26 and a base 29 which together define recess 23.

Figure 11:
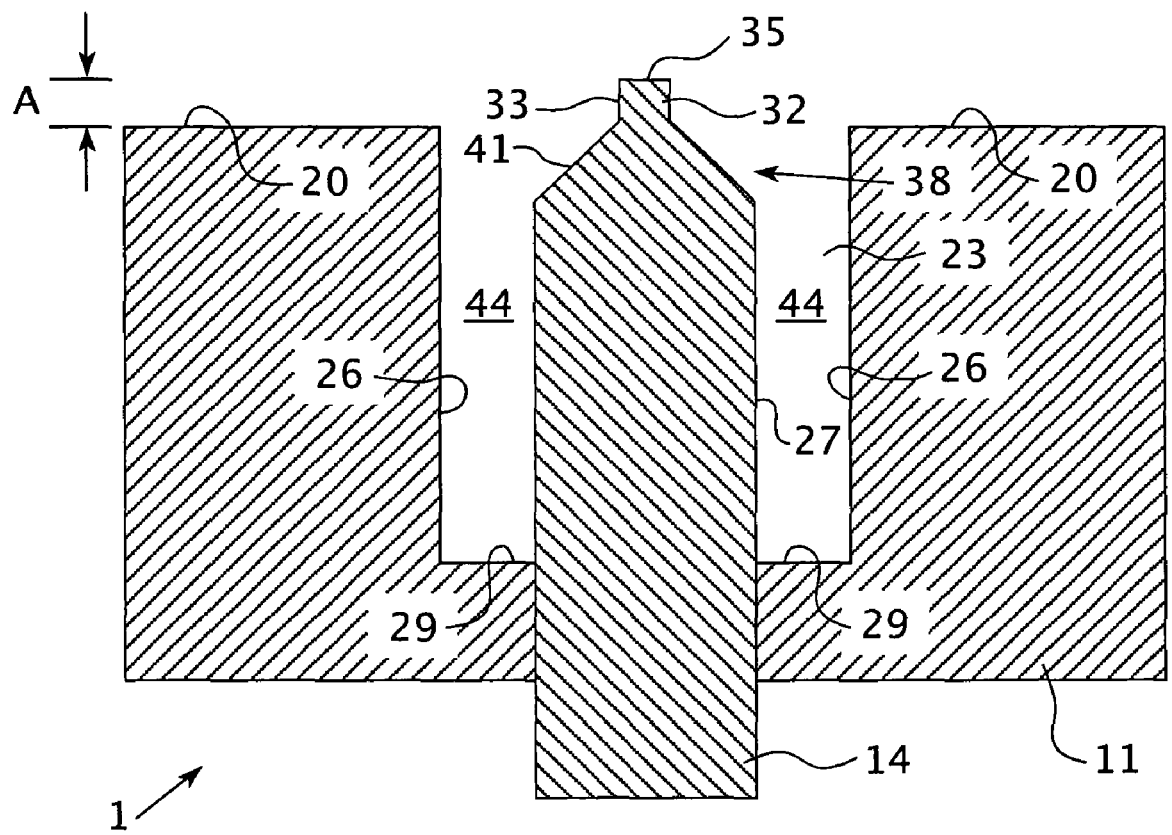
FIG. 11 is a representative sectional view of a portion of the mold apparatus of FIG. 1.

As described previously herein, slide 14 is reversibly positionable between at least a first slide position A (FIG. 11) and a second slide position B (FIG. 3). First slide position A and second slide position B are depicted in FIGS. 11 and 3 with regard to the position of forward surface 35 of distal extension 32 relative to interior surface 20 of first mold portion 11. Slide 14 may be moved manually or mechanically. Typically, slide 14 is moved mechanically, for example hydraulically by means of a drive-arm (not shown). When in first slide position A, forward surface 35 of distal extension 32 of slide 14 extends beyond interior surface 20 of first mold portion 11.

While in first slide position A, forward surface 35 of distal extension 32 of slide 14 extends beyond (e.g., above) interior surface 20 of first mold portion 11. When in first slide position A, the internal surface 26 (e.g., sidewall 26 and base 29) of recess 23 and at least a portion of exterior surface 27 (e.g., sidewall 27, tapered surface 41, and optionally a portion of exterior surface 33 of distal extension 32) together define an extension cavity 44.

Figure 9:
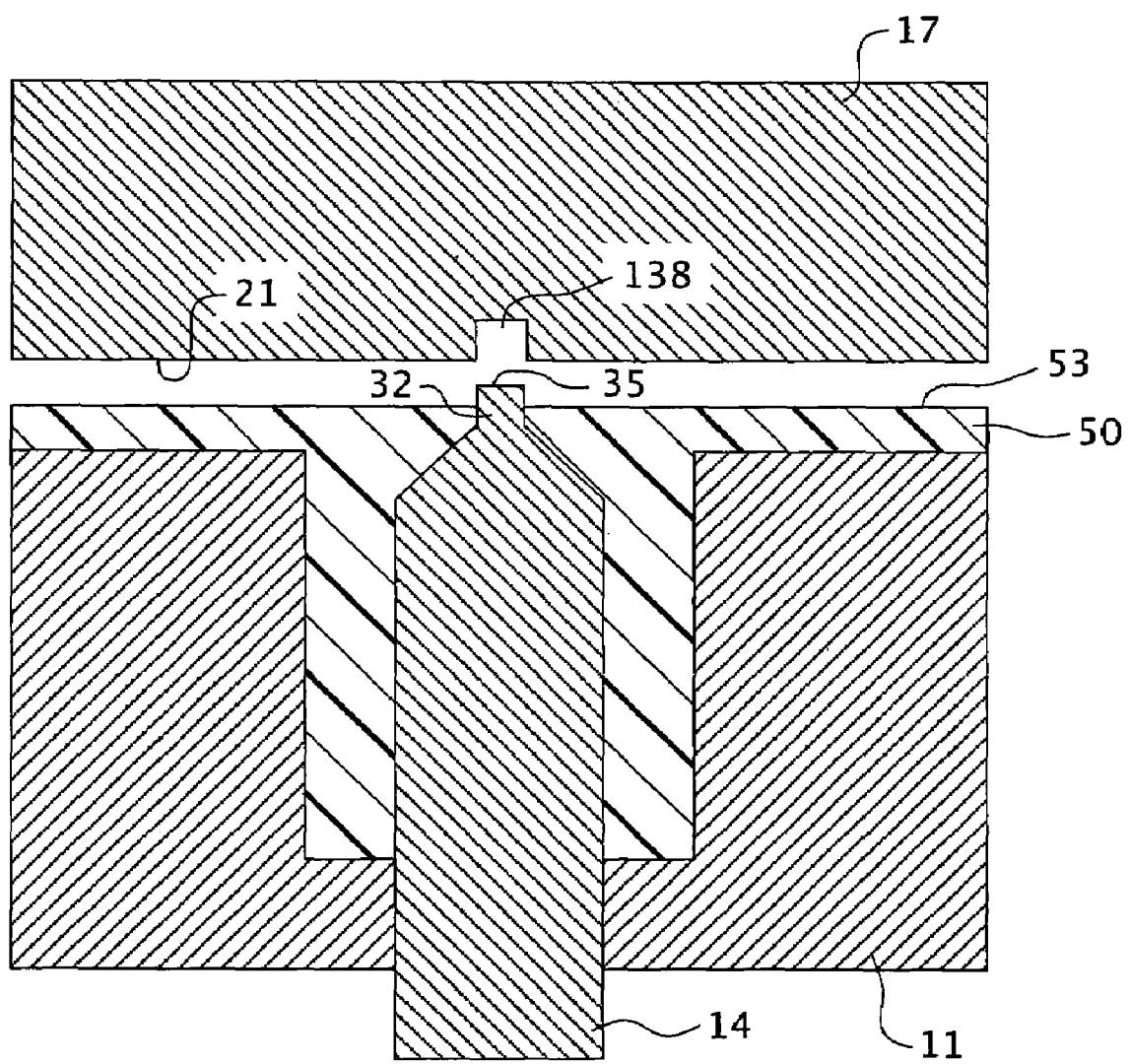
FIG. 9 is a representative sectional view of a mold apparatus that may be used in the method of the present invention, in which the second mold portion includes a socket dimensioned to receive at least a portion of the distal extension of the slide.
Figure 12:
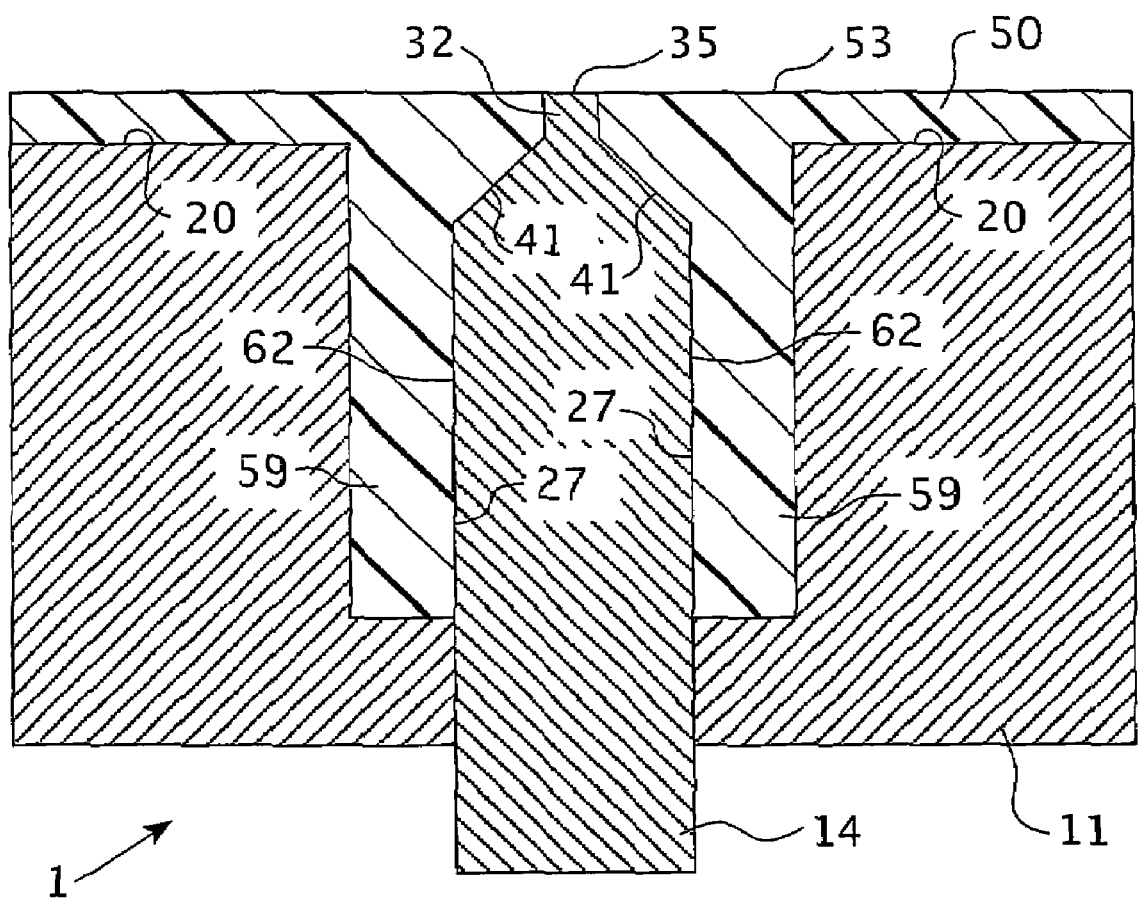
FIG. 12 is a representative sectional view of a portion of the mold apparatus of FIG. 2.

In the compression molding embodiment of the method of the present invention, a first plastic material is introduced into first mold portion 11 and extension cavity 44, and at the same time such that forward surface 35 of distal extension 32 of slide 14 is free from immersion in the first plastic material introduced therein. See, for example, FIG. 12. As depicted in FIG. 12, upper surface 35 of distal extension 32 is even (or level) with upper surface 53 of the first plastic material introduced into first mold portion 11. Alternatively, forward surface 35 of distal extension 32 may be positioned so as to be above upper surface 53 of the first plastic material introduced first mold portion 11, for example as depicted in FIG. 9. Ensuring that forward surface 35 of distal extension 32 is free from immersion in the first plastic material introduced into first mold portion 11 is necessary so that aperture 71 is formed in first surface 53 of first molded section 50 upon retraction of slide 14 to second slide position B. See, for example, FIG. 10.

The first and second plastic materials are typically introduced into first mold portion 11, in the compression molding embodiment of the present invention, at ambient (or atmospheric) pressure. For example, the first and second plastic materials are each typically introduced into (or deposited onto) first mold portion 11 by action of gravity from a position above the first mold portion (e.g., from the exit port of an extruder positioned above first mold portion 11—not shown). To facilitate introduction of the first and second plastic materials, first mold portion 11 is typically reversibly and horizontally positionable (e.g., by shuttling along rails) between a plastic material introduction station (not shown), e.g., below the exit port of an extruder (not shown), and a compression station (not shown) where first mold portion 11 and second mold portion 17 are brought together so as to compress the plastic material introduced into first mold portion 11. While both the first and second mold portions may be reversibly vertically positionable in the compression station, second mold portion 17 is typically reversibly vertically positionable, while first mold portion 11 is substantially vertically stationary.

After introduction of the first plastic material into first mold portion 11 (e.g., as depicted in FIG. 12), first mold portion 11 and second mold portion 17 are positioned in a first compressive mold position (e.g., similar to first mold position C of FIG. 2). When in the first compressive mold position, at least a portion of interior surface 21 of second mold portion 17 compressively contacts the first plastic material (e.g., first surface 53) introduced into first mold portion 11. Compression of the first plastic material ensures spreading thereof over interior surface 20 of first mold portion 11 and interior surface 21 of second mold portion 17, and substantially complete filling of extension cavity 44 with the first plastic material. In addition, compression of the first plastic material serves to expel gas, if any, entrapped within the plastic material (e.g., in the form of gas bubbles). To assist in the expulsion of gasses from the plastic material, the mold apparatus is typically provided with vents (not shown), as is known to the skilled artisan.

The compressive force applied to the first plastic material introduced into first mold portion 11 is typically from 25 psi to 550 psi (1.8 to 38.7 Kg/cm$^2$), more typically from 50 psi to 400 psi (3.5 to 28.1 Kg/cm$^2$), and further typically from 100 psi to 300 psi (7.0 to 21.1 Kg/cm$^2$). The compressive force applied to the first plastic material may be constant or non-constant. For example, the compressive force applied to the first plastic material may initially ramp up at a controlled rate to a predetermined level, followed by a hold for a given amount of time, then followed by a ramp down to ambient pressure at a controlled rate. In addition, one or more plateaus or holds may be incorporated into the ramp up and/or ramp down during compression of the first plastic material.

After or concurrent with compression between first mold portion 11 and second mold portion 17, the first plastic material introduced into first mold portion 11 is allowed to at least partially solidify. Typically, the first plastic material introduced into first mold portion 11 is allowed to at least partially solidify while subjected to compression between the first and second mold portions. Solidification of the first plastic material results in the formation of a first molded section 50 (e.g., FIGS. 2 and 12) of the molded article 2 (FIG. 5). As discussed previously herein, first molded section 50 includes a first surface 53 and a second surface 56, which are opposed one from the other. First molded section 50 further includes at least one molded extension 59, which extends from second surface 56 thereof. Molded extension 59 which is formed within extension cavity 44, is continuous with first molded section 50, and has an internal surface 62, which defines retainer space 126. Upon its formation, internal surface 62 of molded extension 59 abuts at least a portion of exterior surface 27 (e.g., sidewall 27 and tapered surface 41) of slide 14. As depicted in FIGS. 2 and 5, molded extension 59 more particularly has a first prong 65 and a second prong 68, which each extend from second surface 56 of first molded section 50.

As discussed previously herein, allowing the first plastic material to at least partially solidify, and preferably substantially completely solidify, prior to introduction of the second plastic material into the mold, is important for purposes of minimizing and preferably eliminating: (i) the occurrence of sink mark defects in the first (forward or exterior) surface 69 of the molded article 2; and optionally (ii) warping defects in the molded article of the present invention.

In the compression molding embodiment of the present invention, the first plastic material may be a thermoplastic material, which is allowed to substantially completely solidify prior to introduction of the second plastic material into the mold (e.g., the first mold portion). Complete solidification may be achieved by allowing the thermoplastic material of the first plastic material to cool to a temperature T' (as described previously herein with reference to Equation-I) that represents a reduction below the melting point of the thermoplastic material that is 100 percent of the difference between the melting point of the thermoplastic material and 25° C. (i.e., T'=25° C.). Substantially complete solidification of the thermoplastic material of the first plastic material is desirable because it is typically accompanied by cessation of shrinkage thereof (i.e., shrinkage of the plastic material being substantially complete). Complete solidification of the first plastic material, however, may result in an undesirable increase in process cycle time, with an accompanying increase in production costs, due to increased cooling times.

In a further embodiment of the compression molding embodiment of the present invention, the first plastic material introduced into the first mold portion is a thermoplastic material, which is allowed to cool to a temperature such that shrinkage of the first plastic material is substantially complete prior to introduction of the second plastic material in the first mold portion. Allowing the thermoplastic material of the first plastic material to cool to a temperature that is accompanied by substantially complete shrinkage is desirable when such temperature is greater than room temperature (e.g., >25° C.) for reasons that include reducing process cycle time and correspondingly reducing/optimizing related production costs. Such a temperature (e.g., T') may be determined in accordance with Equation-I herein, in which x is 85 to 90, inclusive of the recited values.

After the first plastic material has been allowed to at least partially solidify within the mold, slide 14 is retracted to second slide position B (e.g., FIGS. 3 and 10). When in second slide position B, forward surface 35 of distal extension 32 of slide 14 resides below first surface 20 of first mold portion 11. Retraction of slide 14 to second slide position B results in the formation of aperture 71 in first surface 53 of first molded section 50. In addition, retraction of slide 14 to second slide position B results in positioning the conical upper portion 38 thereof within molded extension 59, such that forward surface 35 of distal extension 32, a portion of exterior surface 27 of slide 14 (in particular, tapered surface 41 of conical upper portion 38 and exterior surface 33 of distal extension 32) and a portion of internal surface 62 of molded extension 59 together define retainer cavity 74. Retainer cavity 74 is in fluid communication with aperture 71.

The retainer cavity has a lateral dimension that is greater than that of the aperture in the first surface of the first molded section, as discussed previously herein. In particular, and with reference to FIG. 10, retainer cavity 74 has a lateral dimension 102 that is greater than a lateral dimension 99 of aperture 71. The difference in the lateral dimensions of aperture 71 and retainer cavity 74 is selected so as to allow for the formation of a retainer 96 (FIGS. 4, 5 and 13) within retainer cavity 74 that will not slip or otherwise slide through aperture 71, and which is retained within retainer space 126 of extension 59 after its formation.

As discussed previously herein, aperture 71 may have any suitable cross sectional shape (e.g., polygonal, circular, oval, irregular or combinations thereof. In addition, aperture 71 may be elongated, for example, in the form of an elongated slot. Retainer cavity 74 may have any suitable shape, provided that it is dimensioned so as to prevent retainer 96, which is formed therein, from sliding through aperture 71, and accordingly such that retainer 96 is retained within molded extension 59 (e.g., lateral dimension 102 of retainer cavity 74 being greater than lateral dimension 99 of aperture 71).

In the compression molding embodiment, first mold portion 11 and second mold portion 17 are separated from each other prior to introduction of the second plastic material into first mold portion 11. The first and second mold portions may be separated prior to sufficient solidification of the first molded section (e.g., 50), in which case further solidification is allowed to proceed after separation of the mold portions. Typically, the first and second mold portions are separated after the first molded section has sufficiently solidified (i.e., after substantial completion of dimensional shrinkage thereof).

After separation of the first and second mold sections, and sufficient solidification of the first molded section 50, a second plastic material is introduced into first mold portion 11 over at least a portion of first surface 53 of first molded section 50. A portion of the introduced second plastic material passes through aperture 71 and into (e.g., filling) retainer cavity 74. The second plastic material is typically introduced into first mold portion 11 at ambient (or atmospheric) pressure by action of gravity from a position above first surface 53 of first molded section 50, similarly as discussed previously herein with regard to introducing the first plastic material into the first mold portion. In the course of introducing the second plastic material into the first mold portion and then compressing the introduced second plastic material, the first mold portion is typically shuttled between a plastic material introduction station (not shown), e.g., below the exit port of an extruder (not shown), and a compression station (not shown) where first mold portion 11 and second mold portion 17 are brought together so as to compress the plastic material introduced into first mold portion 11, as discussed previously herein.

Figure 4:
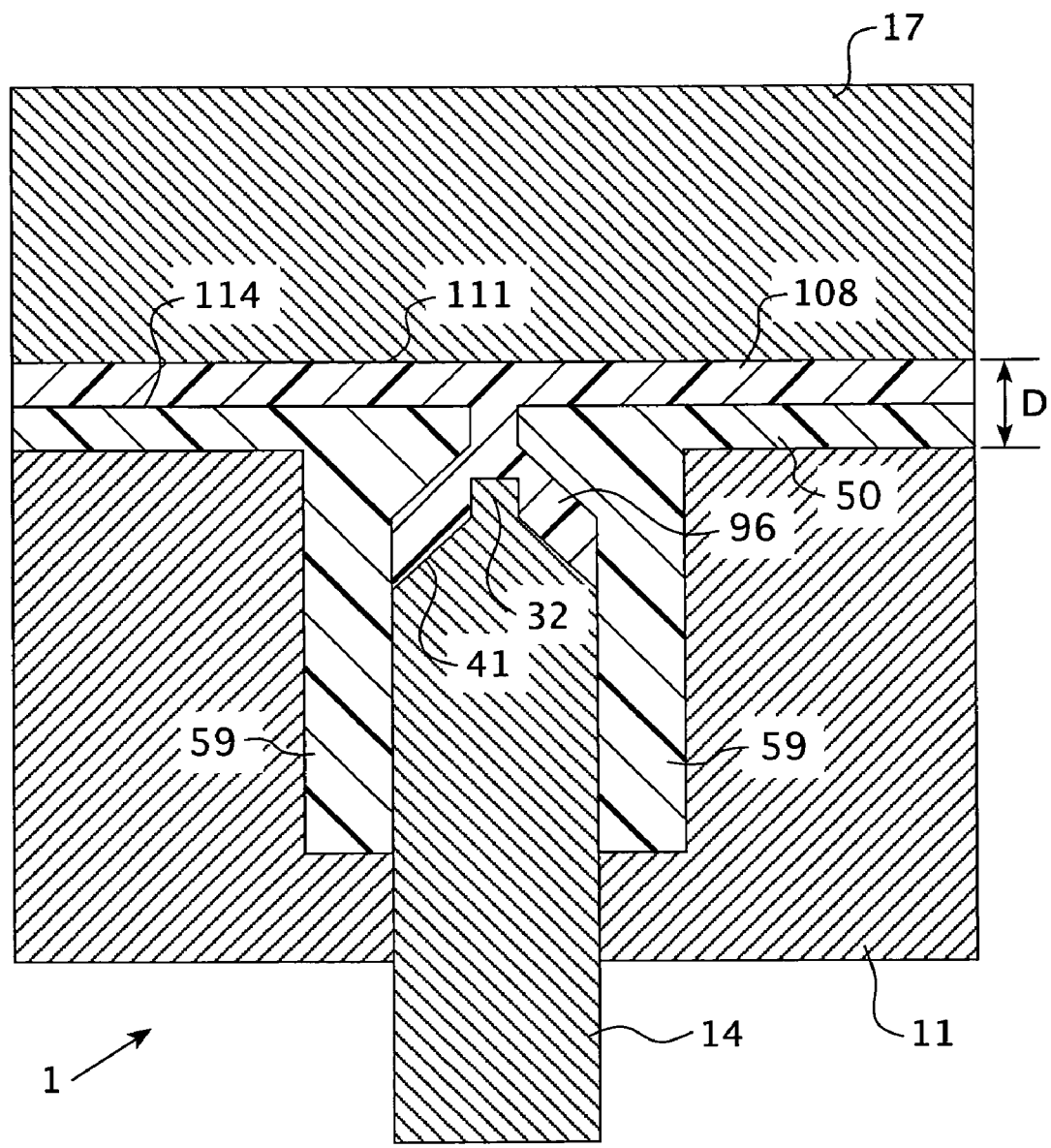
FIG. 4 is a representative sectional view of the mold apparatus of FIG. 3 with a second plastic material introduced therein so as to form a second molded section and a retainer.
Figure 13:
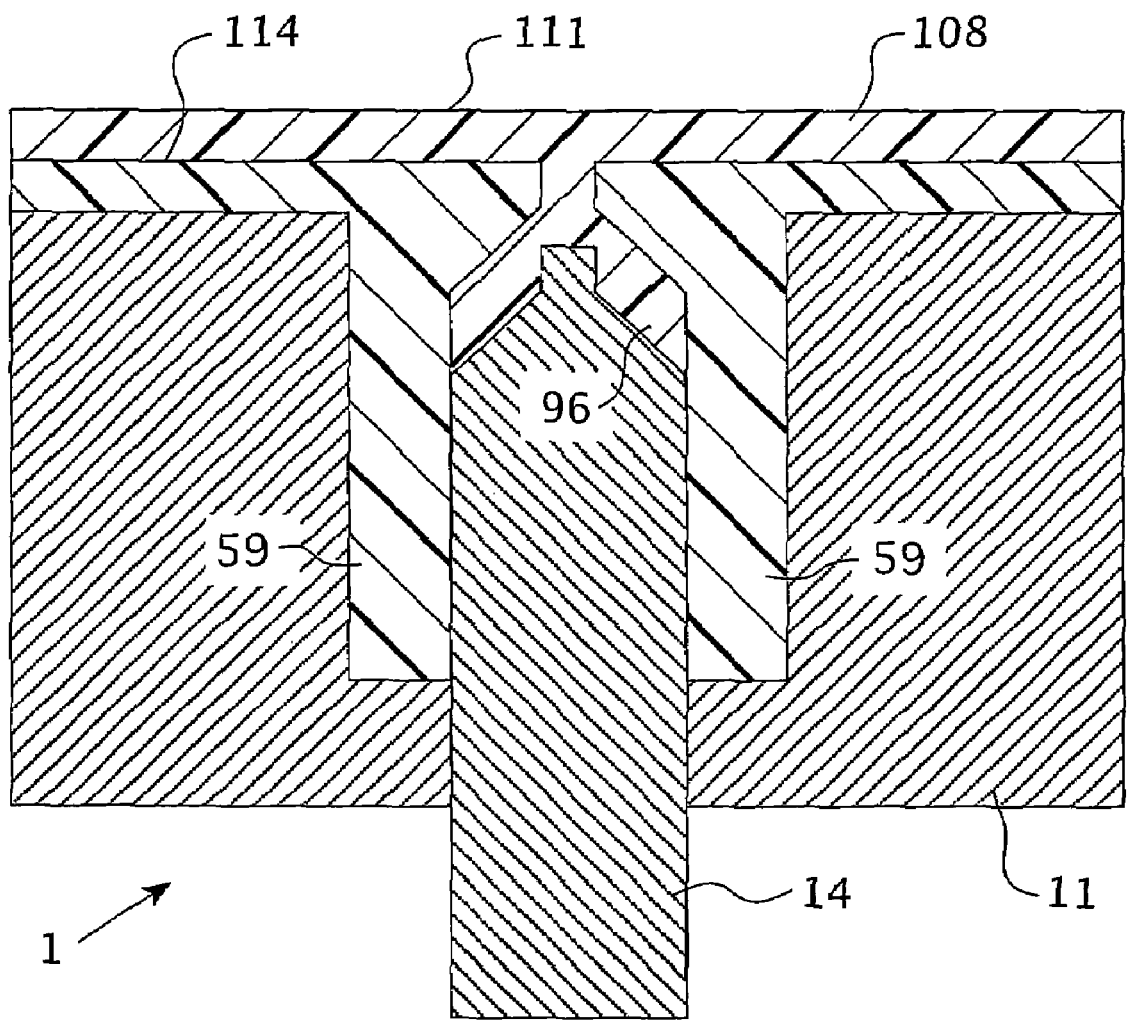
FIG. 13 is a representative sectional view of a portion of the mold apparatus of FIG. 4.

After introduction of the second plastic material into first mold portion 11 (e.g., as depicted in FIG. 13), first mold portion 11 and second mold portion 17 are positioned in a second compressive mold position (e.g., similar to second mold position D of FIG. 4). When in the second compressive mold position, at least a portion of interior surface 21 of second mold portion 17 compressively contacts the second plastic material (e.g., first surface 111 thereof) introduced into first mold portion 11. Compression of the second plastic material ensures spreading thereof over first surface 53 of first molded section 50 and interior surface 21 of second mold portion 17, and substantially complete filling of retainer cavity 74 with the second plastic material. In addition, compression of the second plastic material serves to expel gas, if any, entrapped within the plastic material (e.g., in the form of gas bubbles). To assist in the expulsion of gasses from the second plastic material, the mold apparatus is typically provided with vents (not shown), as is known to the skilled artisan.

The compressive force applied to the second plastic material introduced into first mold portion 11 is typically from 25 psi to 550 psi (1.8 to 38.7 Kg/cm$^2$), more typically from 50 psi to 400 psi (3.5 to 28.1 Kg/cm$^2$), and further typically from 100 psi to 300 psi (7.0 to 21.1 Kg/cm$^2$). The compressive force applied to the second plastic material may be constant or non-constant. For example, the compressive force applied to the second plastic material may initially be ramped up at a controlled rate to a predetermined level, followed by a hold for a given amount of time, then followed by a ramp down to ambient pressure at a controlled rate. In addition, and as previously described herein with regard to the first plastic material, one or more plateaus or holds may be incorporated into the ramp up and/or ramp down during compression of the second plastic material.

The compression molding embodiment results in the formation of a second molded section 108 of the molded article 2 as described previously herein with reference to FIG. 5. In particular, second molded section 108 includes a first surface 111, a second surface 114 and retainer 96. Retainer 96 is formed within retainer cavity 74 and is continuous with second molded section 108 through aperture 71. At least a portion of retainer 96 abuts at least a portion of internal surface 62 of molded extension 59.

The molded article is removed from the mold after compression mold formation of the second molded section. For example, first mold portion 11 and second mold portion 17 are typically separated from each other, and molded article 2 is removed from mold 1 (more particularly from first mold portion 11) by means of one or more ejector pins (not shown) pressing up against second surface 56 of first molded section 50. Alternatively, or in addition to ejector pins, molded article 2 may be removed from first mold portion 11 by slide 14 being moved up against retainer 96 (e.g., repositioned to first slide position A), thereby removing or ejecting molded article 2 from the mold.

The molded article (e.g., molded article 2) prepared in accordance with the compression molding embodiment of the present invention may be described with reference to the disclosure provided previously herein with reference to FIG. 5. In particular, at least a portion of second surface 114 of second molded section 108 of molded article 2 abuts at least a portion of first surface 53 of first molded section 50. Second molded section 108 and first molded section 50 are fixedly attached to each other by at least one retainer 96. The first surface 69 of molded article 2, which is defined by first surface 111 of second molded article 108, is substantially free of sink mark defects, opposite each molded extension 59. In addition to being substantially free of sink mark defects, molded articles prepared in accordance with the compression molding embodiment of the present invention are typically also substantially free of warping defects.

During compression molding of the first plastic material that is introduced into the first mold portion, the forward surface 35 of distal extension 32 of slide 14 typically comes into contact with interior surface 21 of second mold portion 17. In the course of the post-injection compression molding embodiment (discussed previously herein) and the compression molding embodiment of the present invention, as the first plastic material is compressed, slide 14 may be allowed to slide or retract back a linear distance that is equivalent to the linear distance at which the first plastic material is compressed. For example, during compression of the first plastic material, slide 14 may be allowed to slide back to an intermediate slide position (not shown) that is between second slide position B and first slide position A. Allowing slide 14 to retract to an intermediate position during compression, serves to assist or enhance compression of the first plastic material.

With reference to FIG. 9, to assist in compression of the first plastic material in the post-injection compression molding and compression molding embodiments of the present invention, interior surface 21 of second mold portion 17 includes at least one socket 138. Each socket 138 is positioned and dimensioned to receive at least a portion of the distal extension 32 of an accordingly aligned slide 14. When first mold portion 11 and second mold portion 17 are positioned in the first compressive mold position (such that interior surface 21 of second mold portion 17 compressively contacts the first plastic material introduced into first mold portion 11), at least a portion of distal extension 32 of slide 14 is received within socket 138. Socket 138 is preferably dimensioned to tightly or sealingly receive distal extension 32, such that substantially none of the first plastic material introduced into first mold portion 11 enters into socket 138 during compression of the first plastic material.

When distal extension 32 is received within socket 138 during compression of the first plastic material, slide 14 may optionally be allowed to slide or retract back a linear distance that is equal to a portion of the linear distance at which the first plastic material is compressed. Typically, when distal extension 32 is received within socket 138, slide 14 does not slide or retract back during compression of the first plastic material.

Socket 138 may be covered, e.g., with a plate or plug (not shown), prior to positioning the first and second mold portions in the second compressive mold position (e.g., position D of FIG. 4), i.e., before compressing the second plastic material introduced into the first mold portion. Covering or otherwise occluding socket 138 prior to compressing the second plastic material prevents the second plastic material from entering socket 138 and forming raised features on the first surface (e.g., 111) of the second molded section (e.g., 108) of the molded article (e.g., 2). Socket 138 may be covered or occluded by means of a socket slide (not shown), having the same dimensions as socket 138, that is slid forward into socket 138 from within second mold portion 17, such that the terminal surface of the socket slide is substantially even with interior surface 21 of second mold portion 17. Alternatively, socket 138 may be covered or occluded by manually placing a plug into socket 138. Additionally, socket 138 may be covered or occluded by placing or sliding a plate over the open end of socket 138.

Figure 8:
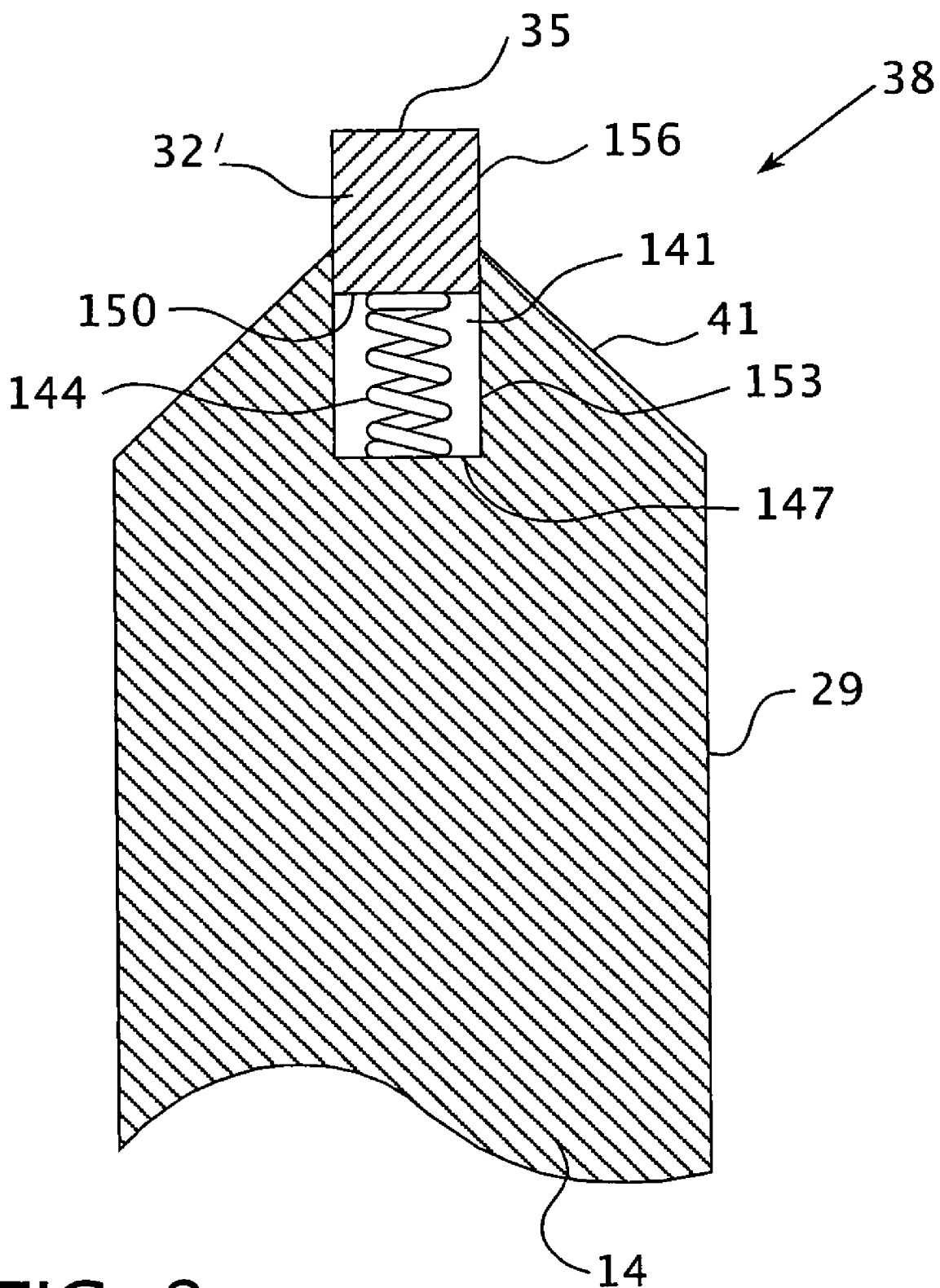
FIG. 8 is a representative sectional view of a slide, that may be used in the method of the present invention, that includes a reversibly positionable distal extension.

In a further embodiment of the present invention, to aid compression of the first plastic material in the course of the post-injection compression molding and compression molding embodiments, the distal extension of the slide is reversibly positionable relative to the upper portion of the slide. When the first and second mold portions are in the first compressive mold position (i.e., during compression of the first plastic material), the forward surface of the distal portion abuts a portion of the interior surface of the second mold portion and is reversibly displaced back towards the upper portion of the slide. With reference to FIG. 8, distal extension 32' is depicted as extending, in an extended original position, from and being reversibly positionable relative to upper portion 38 of slide 14, which includes tapered surface 41. More particularly, upper portion 38 of slide 14 includes a cavity 141 that is dimensioned to reversibly receive distal extension 32'. Cavity 141 further includes a biasing means 144 (e.g., a spring and/or hydraulic cylinder) residing biasingly between lower surface 150 of distal extension 32' and base surface 147 of cavity 141. As interior surface 21 of second mold portion 17 compressively abuts forward surface 35 of distal extension 32', distal extension 32' retracts within cavity 141 to a retracted position (not shown). As first mold portion 11 and second mold portion 17 are separated, biasing means 144 causes distal extension 32' to rise out of cavity 141 and resume its original extended position.

Distal extension 32' of FIG. 8 may further include outwardly extending stops (not shown) that slidingly engage with vertical slots (not shown) in sidewall 153 of cavity 141. The outwardly extending stops and slots engage with each other so as to prevent biasing means 144 from pushing distal extension 32' all of the way out of cavity 141. Alternatively, or in addition thereto, sidewall 153 may include inwardly extending stops (not shown) that slidingly engage with vertical slots (not shown) in the sidewall 156 of distal extension 32'. The inwardly extending stops and slots engage with each other so as to prevent biasing means 144 from pushing distal extension 32' all of the way out of cavity 141.

In the compression molding embodiment of the present invention, the first and second plastic materials may each independently be selected from thermosetting plastic materials and/or thermoplastic materials. The thermosetting plastic materials and thermoplastic materials may each be independently selected from those classes and examples recited previously herein. In addition, the first and second plastic materials may each independently further include reinforcing material(s) and/or additive(s), which may be selected from those classes and examples, and be present in those amounts and ranges as recited previously herein, In accordance with the present invention, there is also provided a molded article having molded extensions extending from a second surface thereof, while the first surface thereof is substantially free of sink mark defects. The molded article may be described more particularly with reference to FIG. 5, which depicts a molded article 2 that includes a first molded section 50, molded from a first plastic material, having a first surface 53, a second surface 56 and at least one molded extension 59, extending from second surface 56. Molded extension 59 is continuous with first molded extension 50. As described previously herein, molded extension 59 and first molded extension 50 are concurrently formed from the same first plastic material. Molded extension 59 has an internal surface 62, which defines a retainer space 126.

First surface 53 of first molded section 50 has an aperture 71 that is in fluid communication with retainer space 126, in the absence of second molded section 108 (i.e., in the case of first molded section 50 alone, without second molded section 108 being present). Aperture 71 is substantially filled with the plastic material of the second molded section 108, as will be discussed in further detail herein. First molded section 50 is molded from a first plastic material.

Molded article 2 also includes second molded section 108, which is molded from a second plastic material, has a first surface 111, a second surface 114 and a retainer 96. Retainer 96 resides within at least a portion of retainer space 126, and abuts at least a portion of internal surface 62 of molded extension 59. Retainer 96 is continuous with second molded section 108 through aperture 71. More particularly, the plastic material of retainer 96 and second molded section 108 extends through and substantially fills aperture 71, and as such retainer 96 and molded section 108 are continuous with each other. As discussed previously herein, second molded section 108 and retainer 96 are concurrently formed from the same second plastic material.

Retainer 96 has a lateral dimension 102 that is greater than the lateral dimension 99 of aperture 99. The relative dimensions and shapes of lateral dimension 102 and 99 are each selected such that retainer 96 will not slip or slide through aperture 71, and is retained within retainer space 126, as discussed previously herein.

With molded article 2, at least a portion of first surface 53 of first molded section 50 abuts at least a portion of second surface 114 of second molded section 108. Depending on the plastic materials from which, and the conditions under which each of first molded section 50 and second molded section 108 are prepared, abutment of first surface 53 and second surface 114 may be accompanied by melt fusion and/or covalent bond formation there-between, as discussed previously herein.

First molded section 50 and second molded section 108 of molded article 2 are fixedly attached to each other by at least one retainer 96. First surface 69 of molded article 2, which is defined by first surface 111 of second molded section 108, is substantially free of sink mark defects. In particular, first surface 69 is free of sink mark defects opposite each molded extension 59. Molded article 2 is also substantially free of warping defects.

Figure 7:
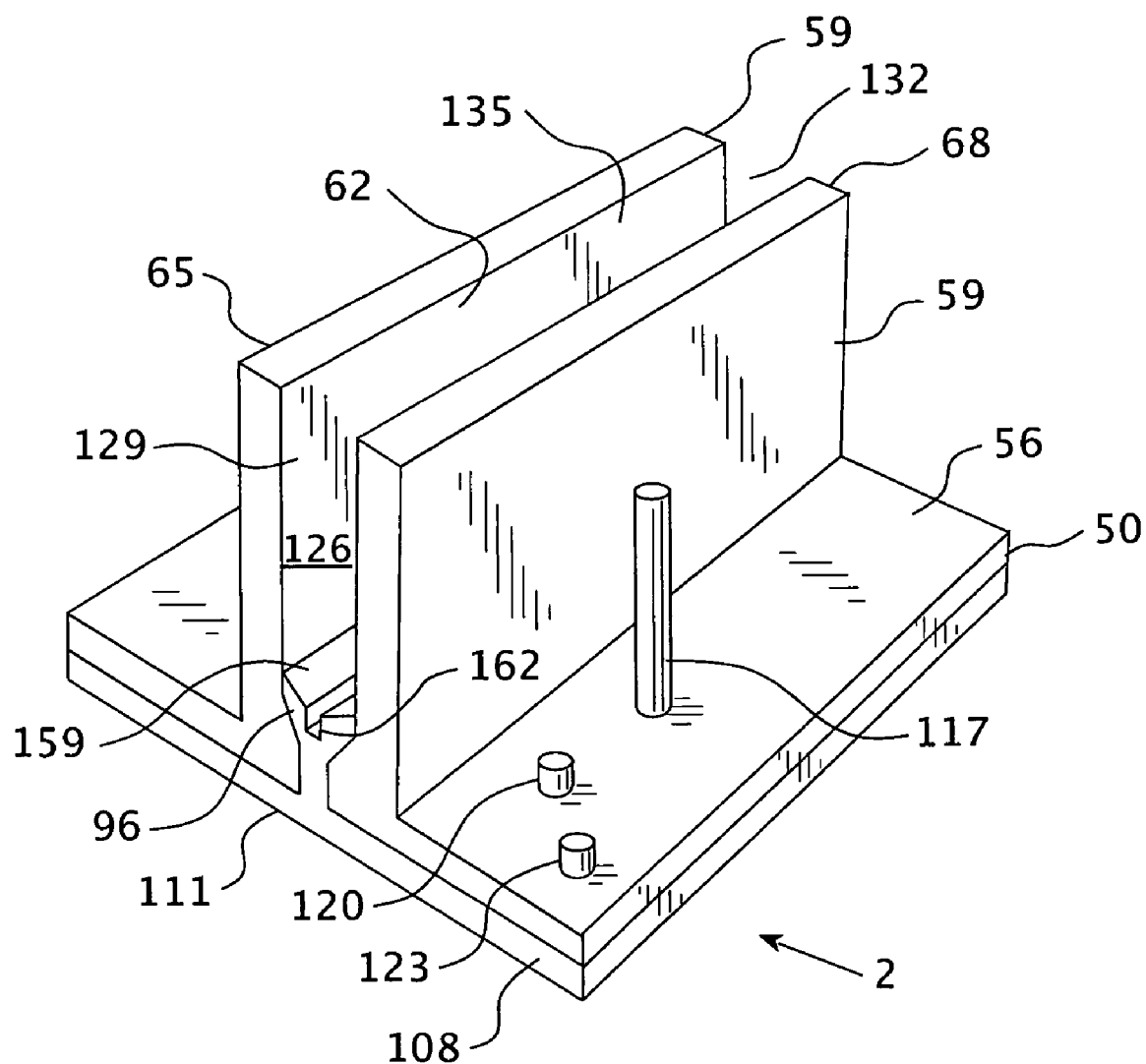
FIG. 7 is a representative perspective view of a molded article according to the present invention that further includes molded bosses and a molded post.

Retainer 96 of FIG. 5 includes a cavity 162, which is formed by molding of the second plastic material against distal extension 32 of slide 14 during molding of retainer 96 and correspondingly second molded section 108. See, for example, FIG. 4. As seen in FIG. 7, cavity 162 is in the form of an elongated slot 162. Retainer 96 also includes a tapered surface 159, which is formed by molding of the second plastic material against tapered surface 41 of upper portion 38 of slide 14 during molding of retainer 96 and correspondingly second molded section 108.

Molded extension 59 as depicted in the drawing figures is in the form of an elongated rib structure having a first prong 65 and a second prong 68, each having an internal surface 62 that together define a retainer space 126 (FIGS. 5 and 7). In addition, molded extension 59 has a first longitudinal open end 129, a second longitudinal open end 132, and an elongated opening 135. Alternatively, the molded extension may be in the form of an enclosed sidewall structure (e.g., a post) having a substantially continuous sidewall structure (e.g., a circular, oval and/or polygonal cross-sectional sidewall structure) having an internal surface that defines the retainer space.

Figure 14:
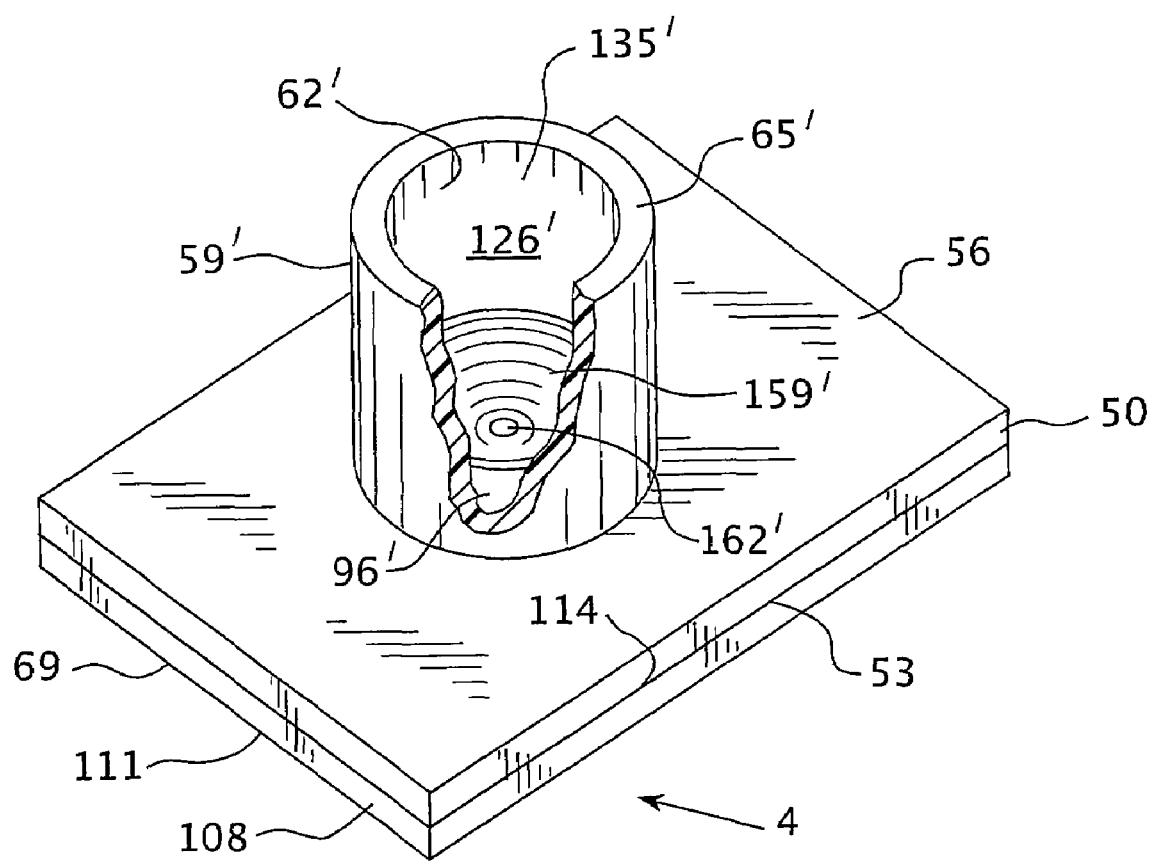
FIG. 14 is a representative partial cut-away perspective view of a molded article according to the present invention in which the molded extension is in the form of an cylinder.

With reference to FIG. 14, there is depicted a molded article 4 according to the present invention that includes a substantially cylindrical molded extension 59' that includes a sidewall 65' having a substantially circular cross-section. Sidewall 65' of cylindrical molded extension 59' has an internal surface 62' that defines a retainer space 126'. Retainer 96' is located within a portion of retainer space 126', and is opposite to open end 135' of cylindrical molded extension 59'. Retainer 96' is continuous with second molded section 108 by means of plastic material thereof extending through an aperture (not shown) in first molded section 50, as described previously herein. The aperture (not shown) in first molded section 50 is substantially circular, and has a dimension (e.g., the diameter thereof that is less than a dimension of retainer 96' (e.g., the diameter thereof, such that retainer 96' is: retained within retainer space 126'; and serves to fixedly attach first molded section 50 and second molded section 108 together. First surface 53 of first molded section 50 abuts second surface 114 of second molded section 108, and first surface 111 of second molded section 108 defines first surface 69 of molded article 4. First surface 111 of second molded section 108 and correspondingly first surface 69 of molded article 4 are depicted in FIG. 14 as an edge line, due to the angle of perspective presented.

Retainer 96' of molded article 4 of FIG. 14 has a substantially conical concave surface 159' having a centrally located cavity 162' therein. Cavity 162' is formed by molding of the second plastic material against the distal extension of the slide during molding of retainer 96' and correspondingly second molded section 108. Conical concave surface 159' is formed by molding of the second plastic material against a conical convex surface of the upper portion of the slide during molding of retainer 96' and correspondingly second molded section 108. For purposes of illustration and with reference to FIG. 3, distal extension 32 may be a cylindrical distal extension having a cylindrical sidewall 33, which results in the formation of cavity 162' of retainer 96'. Accordingly, and with further reference to FIG. 3, tapered surface 41 of upper portion 38 of slide 14 may represent a conical convex surface, which results in the formation of substantially conical concave surface 159' of retainer 96'.

To allow for removal of the molded article of the present invention from the mold in which it is prepared, the molded extension necessarily has an open end (e.g., opening 135) that is in communication with the retainer space (e.g., 126) thereof. Full retraction of slide 14 and/or removal of the molded article from around or off of slide 14 results in the formation of opening 135, in accordance with the molding methods discussed previously herein. The open end of the molded extension may be at least partially closed by attachment of a further wall (not shown), e.g., by means of adhesives, fasteners and/or welding (e.g., high frequency plastic welding) during post-molding operations. Alternatively, opening 135 may be eliminated by a post-molding operation whereby retainer space 126 is filled with another material, such as a further plastic material (e.g., a plastic foam), or an adhesive material.

The molded article of the present invention includes at least one molded extension and at least one retainer, and preferably a plurality of extensions and a plurality of retainers (e.g., 2, 3, 4, 5, 6 or more extensions and retainers). The plurality of extensions and associated retainers may be positioned randomly, regularly (e.g., geometrically) or a combination thereof, throughout the molded article. In an embodiment of the present invention, in addition to including at least one extension having a retainer retained within the retainer cavity of the extension, the molded article includes at least one molded extension that does not include or is not associated with a retainer (i.e., a retainer-free molded extension). Examples of retainer-free molded extensions, include but are not limited to: structural supports, such as ribs (not shown) and posts (e.g., post 117); and mounting supports, such as bosses 120 and 123 of molded article 2 of FIG. 7.

The molded extensions of the molded article of the present invention may be selected from molded structural supports, molded mounting supports and combinations thereof. Structural supports provide the molded article with structural or dimensional stability, and include, but are not limited to, ribs and/or posts. Mounting supports provide a means by which the molded article may be attached to a separate article, such as a frame (e.g., an underlying space frame). A non-limiting example of a mounting support is a boss that may optionally include internal and/or external threading dimensioned for engagement with fasteners, such as bolts and screws. A structural support may also serve as a mounting support. For example, a rib may also be used to attach the molded article to a separate article, such as a frame.

The first and second plastic materials of the molded article may be selected from those classes and examples as described previously herein. For example, the first and second plastic materials may each be independently selected from thermosetting plastic materials and/or thermoplastic materials. In addition, the first and second plastic materials may optionally include reinforcing agents and/or additives selected from those classes and examples, and being present in amounts as described previously herein.

Molded articles that may be prepared according to the methods of the present invention, and according to the present invention, may be used in numerous industries, including for example, transportation (e.g., ground, air, marine and rail), computer, electronic, construction, and architectural industries. Transportation vehicles in which the molded articles of the present invention may be used, include, but are not limited to, automobiles, truck cabs, truck trailers, recreational vehicles, boats, ships, airplanes, rail road engines and rail cars. External vehicle panels that may comprise the molded articles of the present invention, include, for example, fenders, hoods, external door panels, rear decks (or trunks), and external truck trailer walls. Internal vehicle panels that may include the molded articles of the present invention, include, but are not limited to dashboard components, internal door panels, and cabinetry (e.g., in recreational vehicles). More particularly, in the marine industry, molded articles according to the present invention may be used to form boat/ship hulls having a smooth external surface (that contacts the water) and an internal surface having molded extensions (which may be used to attach the hull to other boat/ship structures). In the construction industry, molded articles of the present invention may be used as concrete forms. In the architectural industry, the molded articles of the present invention may be used as internal and external architectural panels, and office cubicle walls. Molded articles according to the present invention may be used as housings in the computer and electronics industries.

The present invention has been described with reference to specific details of particular embodiments thereof. It is not intended that such detailed be regarded as limitations upon the scope of the invention except insofar as and to the extent that they are included in the accompanying claims.

What is claimed is:

1. A method of forming a molded article having molded extensions comprising:
   (a) providing a mold comprising,
      (i) a first mold portion having an interior surface comprising at least one recess having an internal surface,
      (ii) at least one slide comprising an exterior surface and a distal extension having a forward surface, at least one recess having said slide therein, said slide being reversibly positionable between a first slide position and a second slide position within said recess, and
      (iii) a second mold portion having an interior surface, said first mold portion and said second mold portion being reversibly positionable relative to each other;
   (b) positioning said slide in said first slide position such that said forward surface of said distal extension of said slide extends beyond said interior surface of said first mold portion, the internal surface of said recess and at least a portion of the exterior surface of said slide together defining an extension cavity;
   (c) introducing a first plastic material into said first mold portion and said extension cavity, such that said forward surface of said distal extension of said slide is free of immersion in said first plastic material;
   (d) positioning said first mold portion and said second mold portion in a first compressive mold position such that at least a portion of said interior surface of said second mold portion compressively contacts the first plastic material introduced into said first mold portion;
   (e) allowing said first plastic material introduced into said first mold portion and said extension cavity to at least partially solidify, thereby forming a first molded section of said molded article comprising a first surface, a second surface and a molded extension formed in said extension cavity, said second surface having at least one molded extension extending therefrom, said molded extension having an internal surface abutting at least a portion of the exterior surface of said slide;
   (f) retracting said slide to said second slide position, said forward surface of said distal extension of said slide residing below said first surface of said first molded section, retraction of said slide forming an aperture in said first surface of said first molded section, wherein the forward surface of said distal extension, a portion of the exterior surface of said slide, and a portion of the internal surface of said molded extension together define a retainer cavity, said retainer cavity being in fluid communication with said aperture and having a lateral dimension that is greater than a lateral dimension of said aperture;
   (g) separating said first mold portion and said second mold portion from each other;
   (h) introducing a second plastic material into said first mold portion onto said first surface of said first molded section, a portion of said second plastic material passing through said aperture and into said retainer cavity;
   (i) positioning said first mold portion and said second mold portion in a second compressive mold position such that at least a portion of said interior surface of said second mold portion compressively contacts the second plastic material introduced into said first mold portion, thereby forming a second molded section of said molded article comprising a first surface, a second surface and a retainer formed in said retainer cavity, said retainer being continuous with said second molded section through said aperture and abutting at least a portion of said internal surface of said molded extension; and
   (j) removing said molded article from said mold, wherein at least a portion of said second surface of said second molded section abuts at least a portion of said first surface of said first molded section, said second molded section and said first molded section being fixedly attached to each other by said retainer, and said first surface of said second molded section being substantially free of sink mark defects, opposite of each molded extension.

2. The method of claim 1 wherein said second mold portion comprises at least one socket, each socket being positioned and dimensioned to receive at least a portion of said distal extension of said slide, and when said first mold portion and said second mold portion are positioned in said first compressive mold position, at least a portion of said distal extension of said slide is received within said socket.

3. The method of claim 2 further comprising covering each socket prior to positioning said first mold portion and said second mold portion in said second compressive mold position.

4. The method of claim 1 wherein said slide has an upper portion, said distal extension extending from and being reversibly positionable relative to said upper portion of said slide, further wherein when said first mold portion and said second mold portion are positioned in said first compressive mold position, said forward surface of said distal portion abuts a portion of the interior surface of said second mold portion and is reversibly displaced towards said upper portion of said slide.

5. The method of claim 1 wherein said first mold portion further comprises at least one recess that is free of said slide, and said molded article further comprises at least one retainer-free molded extension.

6. The method of claim 1 wherein said molded extension is selected from the group consisting of structural supports, mounting supports and combinations thereof.

7. The method of claim 6 wherein said structural supports are selected from the group consisting of ribs, posts and combinations thereof.

8. The method of claim 1 wherein said first plastic material and said second plastic material are each independently selected from the group consisting of thermosetting plastic materials, thermoplastic materials and combinations thereof.

9. The method of claim 8 wherein said first plastic material and said second plastic material are each independently a thermoplastic material selected from the group consisting of thermoplastic polyurethane, thermoplastic polyurea, thermoplastic polyimide, thermoplastic polyamide, thermoplastic polyamideimide, thermoplastic polyester, thermoplastic polycarbonate, thermoplastic polysulfone, thermoplastic polyketone, thermoplastic polyolefins, thermoplastic (meth) acrylates, thermoplastic acrylonitrile-butadiene-styrene, thermoplastic styrene-acrylonitrile, thermoplastic acrylonitrile-stryrene-acrylate and combinations thereof.

10. The method of claim 1 wherein at least one of said first plastic material and said second plastic material independently comprise a reinforcing material selected from the group consisting of glass fibers, glass beads, carbon fibers, metal flakes, metal fibers, polyamide fibers, cellulosic fibers, nanoparticulate clays, talc and mixtures thereof.

11. The method of claim 8 wherein said first plastic material is a thermoplastic material, and said method further comprising allowing said first plastic material to substantially completely solidify prior to introduction of said second plastic material into said first mold portion and said retainer cavity.

12. The method of claim 1 wherein said first plastic material is a thermoplastic material, and said method further comprising allowing said first plastic material introduced into said first mold portion and said extension cavity to cool to a temperature at which shrinkage of said first plastic material is substantially complete prior to introduction of said second plastic material into said first mold portion.

13. The method of claim 12 wherein said temperature is represented by the following equation, $$T = (\text{Melting Point } ^\circ C.) - (x/100)(\Delta T ^\circ C.)$$

wherein,

T' is said temperature, $\Delta T = (\text{Melting Point } ^\circ C.) - (25^\circ C.)$, Melting Point being the melting point of said first plastic material, and x is a number from 85 to 90.

14. The method of claim 1 wherein said molded article is substantially free of warping defects.

* * * * *